United States Patent
Ignatius et al.

(10) Patent No.: US 8,239,654 B2
(45) Date of Patent: *Aug. 7, 2012

(54) SYSTEMS AND METHODS FOR TRANSFERRING DATA IN A BLOCK-LEVEL STORAGE OPERATION

(75) Inventors: Paul Ignatius, Alpharetta, GA (US); Anand Prahlad, East Brunswick, NJ (US); Mahesh Tyagarajan, San Jose, CA (US); Avinash Kumar, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,534

(22) Filed: Aug. 18, 2011

(65) Prior Publication Data
US 2011/0302383 A1    Dec. 8, 2011

Related U.S. Application Data

(63) Continuation of application No. 12/546,087, filed on Aug. 24, 2009, now Pat. No. 8,019,963, which is a continuation of application No. 11/029,211, filed on Jan. 3, 2005, now Pat. No. 7,581,077, and a continuation-in-part of application No. 09/495,751, filed on Feb. 1, 2000, now Pat. No. 7,209,972, which is a continuation-in-part of application No. 09/038,440, filed on Mar. 11, 1998, now Pat. No. 6,418,478.

(60) Provisional application No. 60/714,507, filed on Mar. 18, 2004, provisional application No. 60/063,831, filed on Oct. 30, 1997.

(51) Int. Cl.
*G06F 12/00* (2006.01)
*G06F 12/16* (2006.01)

(52) U.S. Cl. ........ 711/202; 711/153; 711/154; 711/203; 711/E12.058

(58) Field of Classification Search .................. 711/202, 711/203, 153, 154, E12.058
See application file for complete search history.

(56) References Cited

U.S. PATENT DOCUMENTS

| | | | |
|---|---|---|---|
| 4,296,465 | A | 10/1981 | Lemak |
| 4,686,620 | A | 8/1987 | Ng |
| 4,695,943 | A | 9/1987 | Keeley et al. |
| 4,888,689 | A | 12/1989 | Taylor et al. |
| 4,995,035 | A | 2/1991 | Cole et al. |

(Continued)

FOREIGN PATENT DOCUMENTS
EP    0259912    3/1988
(Continued)

OTHER PUBLICATIONS

U.S. Appl. No. 10/803,542, filed Mar. 18, 2004, Ignatius, Paul et al.

(Continued)

*Primary Examiner* — Yong Choe
(74) *Attorney, Agent, or Firm* — Knobbe Martens Olson & Bear LLP

(57) ABSTRACT

The invention provides a system and method for storing a copy of data stored in an information store. In one embodiment, a data agent reads one or more blocks containing the data from the information store. The data agent maps the one or more blocks to provide a mapping of the blocks, and transmits the one or more blocks and mapping to a media agent for a storage device. The media agent stores the one or more blocks in the storage device according to the mapping.

20 Claims, 22 Drawing Sheets

U.S. PATENT DOCUMENTS

| | | |
|---|---|---|
| 5,005,122 A | 4/1991 | Griffin et al. |
| 5,062,104 A | 10/1991 | Lubarsky et al. |
| 5,093,912 A | 3/1992 | Dong et al. |
| 5,133,065 A | 7/1992 | Cheffetz et al. |
| 5,163,131 A | 11/1992 | Row et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,247,616 A | 9/1993 | Berggren et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,315 A | 7/1994 | Saether et al. |
| 5,347,653 A | 9/1994 | Flynn et al. |
| 5,377,341 A | 12/1994 | Kaneko et al. |
| 5,388,243 A | 2/1995 | Glider et al. |
| 5,410,700 A | 4/1995 | Fecteau et al. |
| 5,428,783 A | 6/1995 | Lake |
| 5,448,724 A | 9/1995 | Hayashi et al. |
| 5,465,359 A | 11/1995 | Allen et al. |
| 5,487,160 A | 1/1996 | Bemis |
| 5,491,810 A | 2/1996 | Allen |
| 5,495,607 A | 2/1996 | Pisello et al. |
| 5,504,873 A | 4/1996 | Martin et al. |
| 5,515,502 A | 5/1996 | Wood |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,588,117 A | 12/1996 | Karp et al. |
| 5,592,618 A | 1/1997 | Micka et al. |
| 5,598,546 A | 1/1997 | Blomgren |
| 5,606,359 A | 2/1997 | Youden et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,644,779 A | 7/1997 | Song |
| 5,651,002 A | 7/1997 | Van Seters et al. |
| 5,673,381 A | 9/1997 | Huai et al. |
| 5,675,511 A | 10/1997 | Prasad et al. |
| 5,680,550 A | 10/1997 | Kuszmaul et al. |
| 5,682,513 A | 10/1997 | Candelaria et al. |
| 5,687,343 A | 11/1997 | Fecteau et al. |
| 5,692,152 A | 11/1997 | Cohen et al. |
| 5,699,361 A | 12/1997 | Ding et al. |
| 5,719,786 A | 2/1998 | Nelson et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,104 A | 6/1998 | Lloyd et al. |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,790,828 A | 8/1998 | Jost |
| 5,805,920 A | 9/1998 | Sprenkle et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,815,462 A | 9/1998 | Konishi et al. |
| 5,829,023 A | 10/1998 | Bishop |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,056 A | 3/1999 | Black et al. |
| 5,887,134 A | 3/1999 | Ebrahim |
| 5,890,159 A | 3/1999 | Sealby et al. |
| 5,897,643 A | 4/1999 | Matsumoto |
| 5,901,327 A | 5/1999 | Ofek |
| 5,924,102 A | 7/1999 | Perks |
| 5,926,836 A | 7/1999 | Blumenau |
| 5,933,104 A | 8/1999 | Kimura |
| 5,936,871 A | 8/1999 | Pan et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,995,091 A | 11/1999 | Near et al. |
| 5,999,629 A | 12/1999 | Heer et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,041,334 A | 3/2000 | Cannon |
| 6,052,735 A | 4/2000 | Ulrich et al. |
| 6,058,494 A | 5/2000 | Gold et al. |
| 6,076,148 A | 6/2000 | Kedem et al. |
| 6,094,416 A | 7/2000 | Ying |
| 6,094,684 A | 7/2000 | Pallmann |
| 6,101,255 A | 8/2000 | Harrison et al. |
| 6,105,129 A | 8/2000 | Meier et al. |
| 6,105,150 A | 8/2000 | Noguchi et al. |
| 6,112,239 A | 8/2000 | Kenner et al. |
| 6,122,668 A | 9/2000 | Teng et al. |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,230,164 B1 | 5/2001 | Rekieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,266 B1 | 4/2002 | Shnelvar |
| 6,374,336 B1 | 4/2002 | Peters et al. |
| 6,381,331 B1 | 4/2002 | Kato |
| 6,385,673 B1 | 5/2002 | DeMoney |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,571,310 B1 | 5/2003 | Ottesen |
| 6,577,734 B1 | 6/2003 | Etzel et al. |
| 6,581,143 B2 | 6/2003 | Gagne et al. |
| 6,604,149 B1 | 8/2003 | Deo et al. |

| Patent No. | Date | Inventor |
|---|---|---|
| 6,631,442 B1 | 10/2003 | Blumenau |
| 6,631,493 B2 | 10/2003 | Ottesen et al. |
| 6,647,396 B2 | 11/2003 | Parnell et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,675,177 B1 | 1/2004 | Webb |
| 6,732,124 B1 | 5/2004 | Koseki |
| 6,742,092 B1 | 5/2004 | Huebsch et al. |
| 6,757,794 B2 | 6/2004 | Cabrera et al. |
| 6,763,351 B1 | 7/2004 | Subramaniam et al. |
| 6,772,332 B1 | 8/2004 | Boebert et al. |
| 6,785,786 B1 | 8/2004 | Gold et al. |
| 6,789,161 B1 | 9/2004 | Blendermann et al. |
| 6,791,910 B1 | 9/2004 | James et al. |
| 6,859,758 B1 | 2/2005 | Prabhakaran et al. |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,909,722 B1 | 6/2005 | Li |
| 6,928,513 B2 | 8/2005 | Lubbers et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,062,761 B2 | 6/2006 | Slavin et al. |
| 7,069,380 B2 | 6/2006 | Ogawa et al. |
| 7,085,904 B2 | 8/2006 | Mizuno et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,174,433 B2 | 2/2007 | Kottomtharayil et al. |
| 7,209,972 B1 | 4/2007 | Ignatius et al. |
| 7,246,140 B2 | 7/2007 | Therrien et al. |
| 7,246,207 B2 | 7/2007 | Kottomtharayil et al. |
| 7,246,272 B2 | 7/2007 | Cabezas et al. |
| 7,269,612 B2 | 9/2007 | Devarakonda et al. |
| 7,272,606 B2 | 9/2007 | Borthakur et al. |
| 7,277,941 B2 | 10/2007 | Ignatius et al. |
| 7,278,142 B2 | 10/2007 | Bandhole et al. |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,298,846 B2 | 11/2007 | Bacon et al. |
| 7,315,923 B2 | 1/2008 | Retnamma et al. |
| 7,346,623 B2 | 3/2008 | Prahlad et al. |
| 7,359,917 B2 | 4/2008 | Winter et al. |
| 7,380,072 B2 | 5/2008 | Kottomtharayil et al. |
| 7,398,429 B2 | 7/2008 | Shaffer et al. |
| 7,401,154 B2 | 7/2008 | Ignatius et al. |
| 7,409,509 B2 | 8/2008 | Devassy et al. |
| 7,448,079 B2 | 11/2008 | Tremain |
| 7,454,569 B2 | 11/2008 | Kavuri et al. |
| 7,457,933 B2 | 11/2008 | Pferdekaemper et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,500,150 B2 | 3/2009 | Sharma et al. |
| 7,509,019 B2 | 3/2009 | Kaku |
| 7,519,726 B2 | 4/2009 | Palliyll et al. |
| 7,523,483 B2 | 4/2009 | Dogan |
| 7,529,748 B2 | 5/2009 | Wen et al. |
| 7,536,291 B1 | 5/2009 | Retnamma et al. |
| 7,546,324 B2 | 6/2009 | Prahlad et al. |
| 7,546,482 B2 | 6/2009 | Blumenau et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 7,631,194 B2 | 12/2009 | Wahlert et al. |
| 7,685,126 B2 | 3/2010 | Patel et al. |
| 7,765,369 B1 | 7/2010 | Prahlad et al. |
| 7,809,914 B2 | 10/2010 | Kottomtharayil et al. |
| 7,831,553 B2 | 11/2010 | Prahlad et al. |
| 7,840,537 B2 | 11/2010 | Gokhale et al. |
| 7,861,050 B2 | 12/2010 | Retnamma et al. |
| 8,019,963 B2 | 9/2011 | Ignatius et al. |
| 2002/0029281 A1 | 3/2002 | Zeidner et al. |
| 2002/0040405 A1 | 4/2002 | Gold |
| 2002/0042869 A1 | 4/2002 | Tate et al. |
| 2002/0042882 A1 | 4/2002 | Dervan et al. |
| 2002/0049778 A1 | 4/2002 | Bell et al. |
| 2002/0065967 A1 | 5/2002 | MacWilliams et al. |
| 2002/0107877 A1 | 8/2002 | Whiting et al. |
| 2002/0194340 A1 | 12/2002 | Ebstyne et al. |
| 2002/0198983 A1 | 12/2002 | Ullmann et al. |
| 2003/0014433 A1 | 1/2003 | Teloh et al. |
| 2003/0016609 A1 | 1/2003 | Rushton et al. |
| 2003/0061491 A1 | 3/2003 | Jaskiewicz et al. |
| 2003/0066070 A1 | 4/2003 | Houston |
| 2003/0079112 A1 | 4/2003 | Sachs et al. |
| 2003/0169733 A1 | 9/2003 | Gurkowski et al. |
| 2004/0073716 A1 | 4/2004 | Boom et al. |
| 2004/0088432 A1 | 5/2004 | Hubbard et al. |
| 2004/0107199 A1 | 6/2004 | Dalrymple et al. |
| 2004/0193953 A1 | 9/2004 | Callahan et al. |
| 2004/0210796 A1 | 10/2004 | Largman et al. |
| 2005/0033756 A1 | 2/2005 | Kottomtharayil et al. |
| 2005/0114477 A1 | 5/2005 | Willging et al. |
| 2005/0166011 A1 | 7/2005 | Burnett et al. |
| 2005/0172093 A1 | 8/2005 | Jain |
| 2005/0246568 A1 | 11/2005 | Davies |
| 2005/0256972 A1 | 11/2005 | Cochran et al. |
| 2005/0262296 A1 | 11/2005 | Peake |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0044674 A1 | 3/2006 | Martin et al. |
| 2006/0149889 A1 | 7/2006 | Sikha |
| 2006/0224846 A1 | 10/2006 | Amarendran et al. |
| 2007/0288536 A1 | 12/2007 | Sen et al. |
| 2008/0059515 A1 | 3/2008 | Fulton |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0256173 A1 | 10/2008 | Ignatius et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0131461 A1 | 5/2010 | Prahlad |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1115064 | 12/2004 |
| GB | 2366048 | 2/2002 |
| WO | WO 95/13580 | 5/1995 |
| WO | WO 98/39707 | 9/1998 |
| WO | WO 98/39709 | 9/1998 |
| WO | WO 99/12098 | 3/1999 |
| WO | WO 99/14692 | 3/1999 |
| WO | WO 99/17204 | 4/1999 |
| WO | WO 02/05466 | 1/2002 |
| WO | WO 2004/090788 | 10/2004 |
| WO | WO 2005/055093 | 6/2005 |

OTHER PUBLICATIONS

U.S. Appl. No. 11/269,513, filed Nov. 7, 2005, Prahlad, et al.
U.S. Appl. No. 11/269,520, filed Nov. 7, 2005, Gokhale, et al.
U.S. Appl. No. 11/738,914, filed Apr. 23, 2007, Ignatius, Paul et al.
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, Mass Storage Archiving in Network Environments, Institute of Electrical and Electronics Engineers (IEEE), 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Canadian Office Action, Application No. CA/2544063, dated Dec. 10, 2009.
Commvault Systems, Inc., Continuous Data Replicator 7.0, Product Data Sheet, 2007.
Eitel, "Backup and Storage Management in Distributed Heterogeneous Environments," IEEE, 1994, pp. 124-126.
European Office Action, Application No. EP/019067693, dated Aug. 12, 2009.
European Office Action, Application No. EP/019067693, dated Sep. 24, 2007.
Farley, "Building Storage Networks," pp. 328-331, Osborne/McGraw-Hill, 2000.
Gait, "The Optical File Cabinet: A Random-Access File system for Write-Once Optical Disks," IEEE Computer, vol. 21, No. 6, pp. 11-22 (1988).
Gibson, "Network Attached Storage Architecture," pp. 37-45, ACM, Nov. 2000.
Great Britain Office Action, Application No. GB/06116685, dated Nov. 14, 2006.
http://en.wikipedia.org/wiki/Naive_Bayes_classifier.
Indian Office Action, Application No. IN/1625/KOLNP/2006, dated May 10, 2010.
Indian Office Action, Application No. IN/656/CHENP/2005, dated Jun. 29, 2006.
International Search Report and International Preliminary Report on Patentability, PCT/US2003/029105, dated Dec. 4, 2005.
International Search Report and Written Opinion dated Nov. 13, 2009, PCT/US2007/081681.
International Search Report, PCT/US2001/002931, dated Jun. 3, 2002.
Israeli Office Action, Application No. IL/175036, dated Jul. 6, 2010.
Jander, "Launching Storage-Area Net," Data Communications, US, McGraw Hill, NY, vol. 27, No. 4(Mar. 21, 1998), pp. 64-72.
Recycle Bin (Windows), Aug. 2007, Wikipedia, pp. 1-3.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321-30454-3.
Witten et al., Data Mining: Practical Machine Learning Tools and Techniques, Ian H. Witten & Eibe Frank, Elsevier (2005) ISBN 0-12-088407-0.
Written Opinion; International Application No. PCT/US05/40606; mailed Mar. 1, 2007; 5 pages.
Canadian Office Action, Application No. CA/2499073, dated Oct. 7, 2009.
Canadian Office Action, Application No. CA/2499073, dated Dec. 24, 2010.

SYSTEMS AND METHODS FOR TRANSFERRING DATA IN A BLOCK-LEVEL STORAGE OPERATION

RELATED APPLICATIONS

This application is a continuation of U.S. patent application Ser. No. 12/546,087, filed Aug. 24, 2009, which is a continuation of U.S. patent application Ser. No. 11/029,211, filed Jan. 3, 2005, now U.S. Pat. No. 7,581,077, issued Aug. 25, 2009, which claims the benefit of priority under 35 U.S.C. §119(e) of U.S. Provisional Application No. 60/714,507, filed Mar. 18, 2004, and which is a continuation-in-part application U.S. patent application Ser. No. 09/495,751, filed Feb. 1, 2000, now U.S. Pat. No. 7,209,972, issued Apr. 24, 2007, which is a continuation-in-part application of U.S. patent application Ser. No. 09/038,440, filed Mar. 11, 1998, now U.S. Pat. No. 6,418,478, issued Jul. 9, 2002, which is based on U.S. Provisional Application No. 60/063,831, filed on Oct. 30, 1997, each of which is hereby incorporated herein by reference in its entirety.

BACKGROUND

1. Field

The invention relates to data transfer mechanisms, and in particular, to a software-based, high speed DataPipe for providing high speed and reliable data transfer between computers.

2. Description of the Related Art

It is fairly obvious that data, in the process of being archived or transferred from one location to another, will pass through various phases where different operations such as compression, network transfer, storage, etc. will take place on it. There are essentially two approaches that can be taken when implementing such a transfer mechanism. One would be to split the archival process into sub-tasks, each of which would perform a specific function (e.g. Compression). This would then require copying of data between sub-tasks, which could prove processor intensive. The other method would be to minimize copies, and have a monolithic program performing all of the archival functions. The downside to this would be loss of parallelism. A third alternative would of course be to use threads to do these tasks and use thread-signaling protocols, however, it is realized that this would not be entirely practical since threads are not fully supported on many computing platforms.

Accordingly, it is highly desirable to obtain a high-speed data transfer mechanism implemented in software and developed for the needs of high speed and reliable data transfer between computers.

It is an object of the invention to disclose the implementation of the DataPipe in accordance with CommVault System's Vault98 backup and recovery product. While developing the DataPipe, it is assumed that data, as it moves from archiving source (backup client) to archiving destination (backup server as opposed to media), may undergo transformation or examination at various stages in between. This may be to accommodate various actions such as data compression, indexing, object wrapping etc. that need to be performed on data being archived. Another assumption is the data may be transmitted over the network to remote machines or transferred to a locally attached media for archival.

Both the sending and the receiving computers execute software referred to herein as the DataPipe. Although the DataPipe transfer mechanism to be described herein is operative as a key component of backup and recovery software product schemes, the DataPipe is not restricted to that use. It is a general purpose data transfer mechanism implemented in software that is capable of moving data over a network between a sending and a receiving computer at very high speeds and in a manner that allows full utilization of one or more network paths and the full utilization of network bandwidth. A DataPipe can also be used to move data from one storage device to another within a single computer without the use of a network. Thus, the DataPipe concept is not confined to implementation only in networked systems, but is operable to transfer data in non-networked computers as well.

Further, in the case of a networked system, the DataPipe, and variations thereof, can be used to perform storage operations such as backups, snapshots, incremental backups, incremental snapshots, archiving and migration of data over the network, whether the network comprises a local area network, storage area network or a wide area network. The data is read and transferred from a source information store. The blocks in which the data is stored are mapped to create a block mapping. The data and block mapping are transmitted to a storage device where the data is stored in the same block order as it was stored in the information store according to the block mapping, as opposed to the blocks being stored out of order at a logical level. Individual blocks that are changed or added to the information store may be copied out, transmitted and stored as they change. These individual blocks are stored in the same order as they were stored in the information store, wherein each changed block replaces its older version, rather than by adding an additional logical block to represent the changes in the data.

SUMMARY

The invention provides, in a communications system having an origination storage device and a destination storage device, a data transfer pipeline apparatus for transferring data in a sequence of N stages, where N is a positive integer greater than one, from the origination to the destination storage device. The apparatus comprises dedicated memory having a predetermined number of buffers dedicated for carrying data associated with the transfer of data from the origination device or process to the destination device or process; and master control module for registering and controlling processes associated with the data transfer apparatus for participation in the N stage data transfer sequence. The processes include at least a first stage process for initiating the data transfer and a last Nth stage process for completing data transfer. The first stage process is operative to allocate a buffer from the predetermined number of buffers available within the dedicated memory for collection, processing, and sending of the data from the origination device to a next stage process. The last Nth stage process is operative to receive a buffer allocated to the first stage process from the (N-1)th stage process in the data transfer sequence and to free the buffer upon processing completion and storage in the destination device to permit reallocation of the buffer. The master control process further includes a means for monitoring the number of buffers from the pool of buffers allocated or assigned to particular processes in the pipeline, wherein the monitor means is operative to prevent allocation of further buffers to a particular process when the number of buffers currently allocated exceeds a predetermined threshold.

The invention further provides a system and method for storing a copy of data stored in an information store. In one embodiment, a data agent maps one or more blocks that are read from the information store to provide a mapping of the blocks. The one or more blocks and mapping are transmitted to a storage device. A media agent for the storage device receives the one or more blocks. The media agent for the storage device stores the one or more blocks in the storage device according to the mapping.

BRIEF DESCRIPTION OF THE DRAWINGS

The invention will be better understood with reference to the following drawings, in which.

DETAILED DESCRIPTION OF THE PREFERRED EMBODIMENTS

General Component Architecture

Figure 1A:
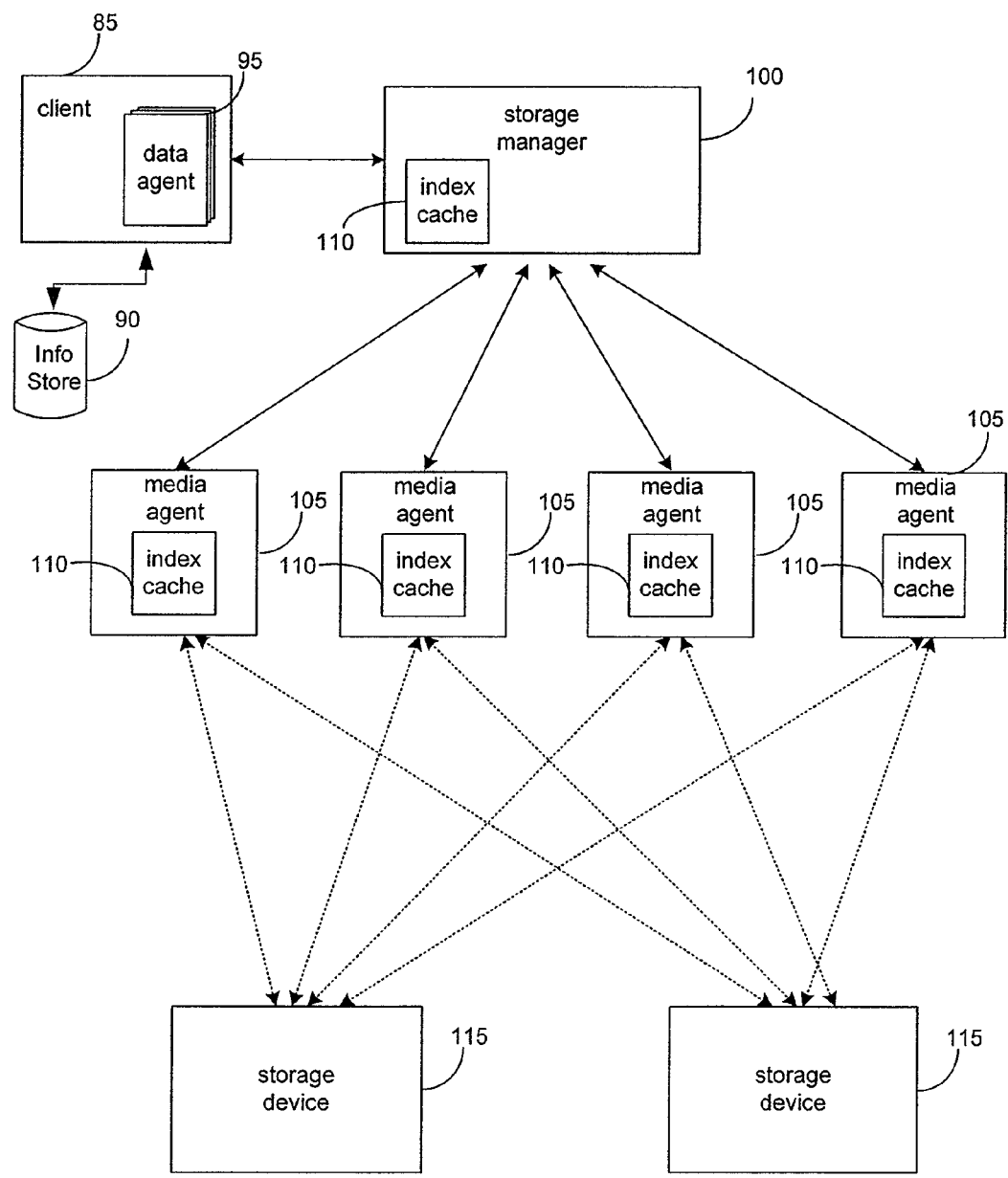
FIG. 1A is a block diagram of a network architecture for a system to perform storage operations on electronic data in a computer network according to an embodiment of the invention.

FIG. 1A presents a block diagram of a network architecture for a system to perform storage operations on electronic data in a computer network according to an embodiment of the invention. As shown, the system includes a storage manager 100 and one or more of the following: a client 85, an information store 90, a data agent 95, a media agent 105, an index cache 110, and a storage device 115. The system and elements thereof are exemplary of a three-tier backup system such as the CommVault Galaxy backup system, available from CommVault Systems, Inc. of Oceanport, N.J., and further described in application Ser. No. 09/610,738 which is incorporated herein by reference in its entirety.

A data agent 95 is generally a software module that is generally responsible for archiving, migrating, and recovering data of a client computer 85 stored in an information store 90 or other memory location. Each client computer 85 has at least one data agent 95 and the system can support many client computers 85. The system provides a plurality of data agents 95 each of which is intended to backup, migrate, and recover data associated with a different application. For example, different individual data agents 95 may be designed to handle Microsoft Exchange data, Lotus Notes data, Microsoft Windows 2000 file system data, Microsoft Active Directory Objects data, and other types of data known in the art.

Further, at least one or more of the data agents may be implemented with, or contain, or be contained in, one or more procedures which are executed by the data pipe described with respect to FIGS. 1B-13 below. These procedures perform tasks such as compression, encryption, and content analysis of data for transmission in a shared memory as described in detail below with respect to FIGS. 1B-13.

If a client computer 85 has two or more types of data, one data agent 95 is generally required for each data type to archive, migrate, and restore the client computer 85 data. For example, to backup, migrate, and restore all of the data on a Microsoft Exchange 2000 server, the client computer 85 would use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85.

The storage manager 100 is generally a software module or application that coordinates and controls the system. The storage manager 100 communicates with all elements of the system including client computers 85, data agents 95, media agents 105, and storage devices 115, to initiate and manage system backups, migrations, and recoveries.

A media agent 105 is generally a software module that conducts data, as directed by the storage manager 100, between the client computer 85 and one or more storage devices 115 such as a tape library, a magnetic media storage device, an optical media storage device, or other storage device. The media agent 105 is communicatively coupled with and controls the storage device 115. The media agent 105 generally communicates with the storage device 115 via a local bus such as a SCSI adaptor. In some embodiments, the storage device 115 is communicatively coupled to the data agent 105 via a Storage Area Network ("SAN").

Each media agent 105 maintains an index cache 110 which stores index data the system generates during copy and transmission operations as further described herein. For example, storage operations for Microsoft Exchange data generate index data. Index data provides the system with an efficient mechanism for locating user files for recovery operations. This index data is generally stored with the data backed up to the storage device 115, and the media agent 105 that controls the storage operation also writes an additional copy of the index data to its index cache 110. The data in the media agent 105 index cache 110 is thus readily available to the system for use in storage operations and other activities without having to be first retrieved from the storage device 115.

The storage manager 100 also maintains an index cache 110. Index data is also used to indicate logical associations between components of the system, user preferences, management tasks, and other useful data. For example, the storage manager 100 might use its index cache 110 to track logical associations between media agents 105 and storage devices 115.

In some embodiments, components of the system may reside and execute on the same computer. In some embodiments, a client computer 85 component such as a data agent 95, a media agent 105, or a storage manager 100 coordinates and directs local archiving, migration, and retrieval application functions as further described in application Ser. No. 09/610,738. This client computer 85 component can function independently or together with other similar client computer 85 components.

DataPipe

The objective of the DataPipe according to the present invention is to move data as quickly as possible from point A to point B (which may be on the same or different computers within a network) while performing a variety of operations (compression, encryption, content analysis, etc.) on the data. In order to meet this objective, parallel processing must be fully exploited, network bandwidth must be fully utilized, and CPU cycles must be minimized. The DataPipe must be efficiently implemented on a wide variety of computer systems such that heterogeneous systems on a network can use a DataPipe to transfer data to each other.

A DataPipe comprises a named set of tasks executing within one or more computers that cooperate with each other to transfer and process data in a pipelined manner. Within a DataPipe, a pipeline concept is used to improve performance of data transfer across multiple computers in a network. However, within a DataPipe, any stage within the pipeline may have multiple instances, thus greatly increasing the scalability and performance of the basic pipeline concept.

The DataPipe mechanism processes data by dividing its processing into logical tasks that can be performed in parallel. It then sequences those tasks in the order in which they are to act on the data. For example, a head task may extract data from a database, a second task may encrypt it, a third may compress it, a fourth may send it out over the network, a fifth may receive it from the network, and a sixth may write it to a tape. The latter two tasks may reside on a different computer than the others, for example.

All of the tasks that comprise a single DataPipe on a given computer have access to a segment of shared memory that is divided into a number of buffers. A small set of buffer manipulation primitives is used to allocate, free, and transfer buffers between tasks.

Semaphores (or other OS specific mutual exclusion or signaling primitives) are used to coordinate access to buffers between tasks on a given computer. Special tasks, called network agents, send and receive data across network connections using standard network protocols. These agents enable a DataPipe to connect across multiple computer systems. A single DataPipe can therefore reside on more than one computer and could reside on computers of different types.

Each task may be implemented as a separate thread, process, or as a procedure depending on the capabilities of the computing system on which the DataPipe is implemented.

The data exchange paradigm called the DataPipe has been fashioned to provide solutions to the problems associated and encountered in prior art data transfer systems. The salient features of this method are as follows:

1. Split the whole task of processing on data into logical sub tasks and sequence them according to the order in which they are supposed to act on the data stream.
2. Use dedicated process/threads to perform network transfer.
3. Make all the dedicated tasks share a single large shared memory segment.
4. Split the shared memory segment into small buffers so that this single buffer space can be shared among various execution threads at various stages of tasks.
5. Use semaphores (or other OS specific mutual exclusion or signaling primitives) to transfer control over the data segments between modules.

As mentioned previously, each task may be implemented as a separate thread, or process, or as a procedure in a monolithic process (in cases where native platforms don't support any forms of parallel execution or multi processing). For data transfer across network, dedicated network readers and writers ensure communication across the net.

Figure 1B:
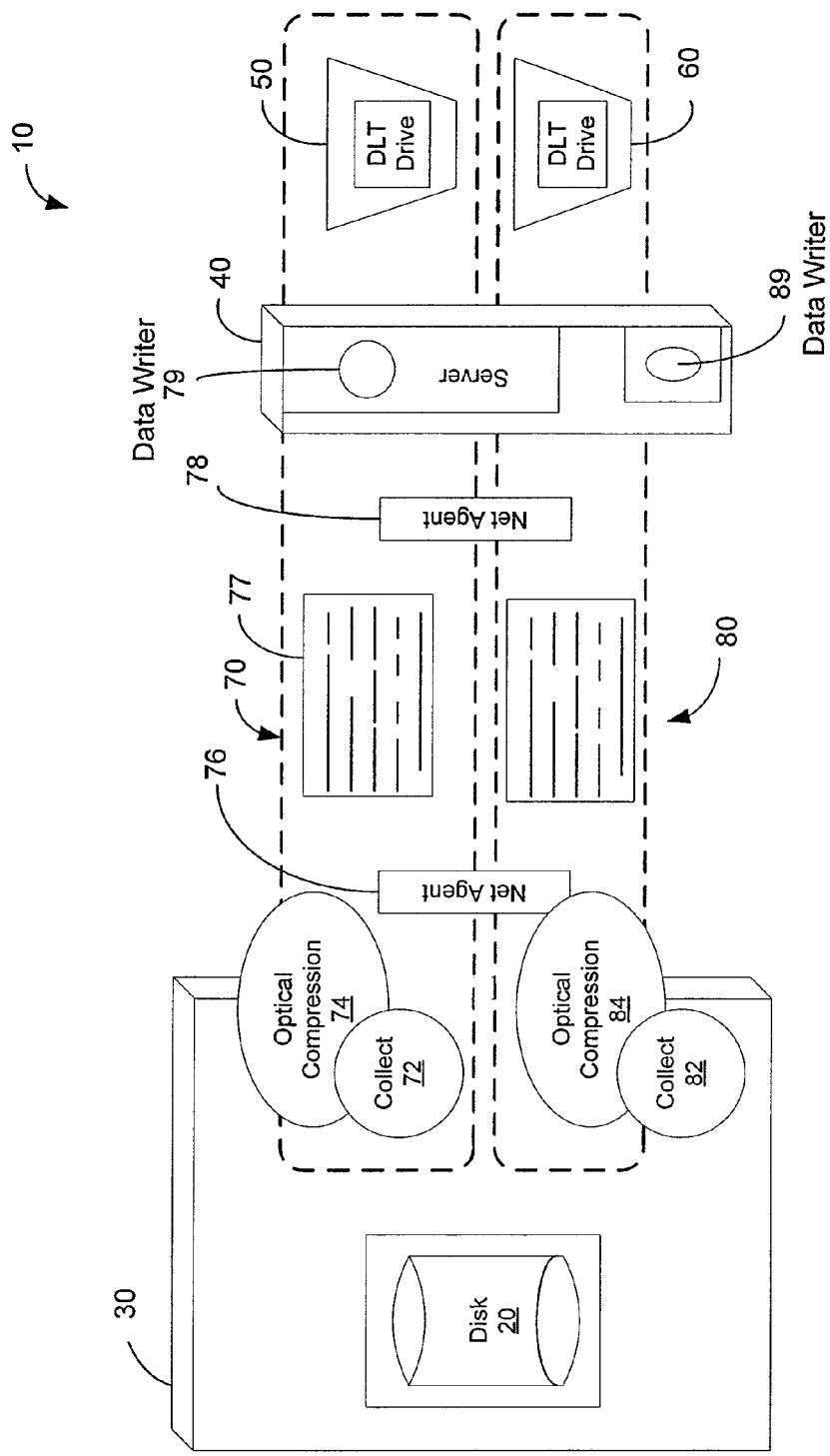
FIG. 1B is a block diagram of a DataPipe architecture in accordance with an embodiment of the present invention.

FIG. 1B shows a steady state picture of how the DataPipe architecture 10 is set up according to the present invention. There is shown a disk 20 residing on a computer machine 30 such as a SUN MICROSYSTEMS INC., SPARCSTATION 2, which houses information or data to be backed up or archived to server computer 40 (which may be for instance a SPARC 10) via optical or DLT devices 50 and 60 respectively. As one can ascertain, the DataPipe represents the end-to-end architecture which may be utilized during database backup from the disk drive 20 where the database will be archived to the tape or optical devices 50 and 60 at server 40. The DataPipe thus removes the network as the limiting factor in backup performance. As a result, the device pool defines the performance capabilities.

As shown in FIG. 1B, the DataPipe or stream 70 is created for the transfer of data for each device in the device pool to be used simultaneously, which comprises modules 72, 74, 76, 78, 79 and 50. Similarly, a second DataPipe 80 is shown comprised of modules 82, 84, 76, 78, 89 and 60. Note that if additional archive devices are used to backup data and parallel further DataPipes would be provided. Since one can ascertain the concept of the DataPipe through explanation of one path or thread by which data is transferred, further description will focus on processing through a single DataPipe or stream 70, as shown in FIG. 1B. At the head of the DataPipe is the collector component 72 which is responsible for obtaining the database information from disk 20. The data is passed down in buffers residing in dedicated shared memory (e.g. RAM memory) through the pipeline 70, through an optional compression module 74, to the network interface modules 76. At the network interface, data is multiplexed and parallel network paths 77 obtain maximum throughput across the network. The network may be, for example, the well-known Ethernet, or any network capable of supporting TCP/IP protocols including FDDI or ATM networks. The number of network paths utilized for each stream is a configurable parameter determined by the bandwidth of the network and configurable via a user interface. Note that as higher performance levels are necessary, additional devices may be used simultaneously with additional network interfaces added and utilized to further increase network throughput. On the receiving side, from the database server 40, the device pull appears local to the machine and the DataPipe architecture appears as a cloud with no constraints to performance. Network interface module 78 operates to transfer the data received across the network to device 50 for storage at server 40. Thus, the final task of storing or archiving the data is accomplished at archive device module 50.

Figure 2A:
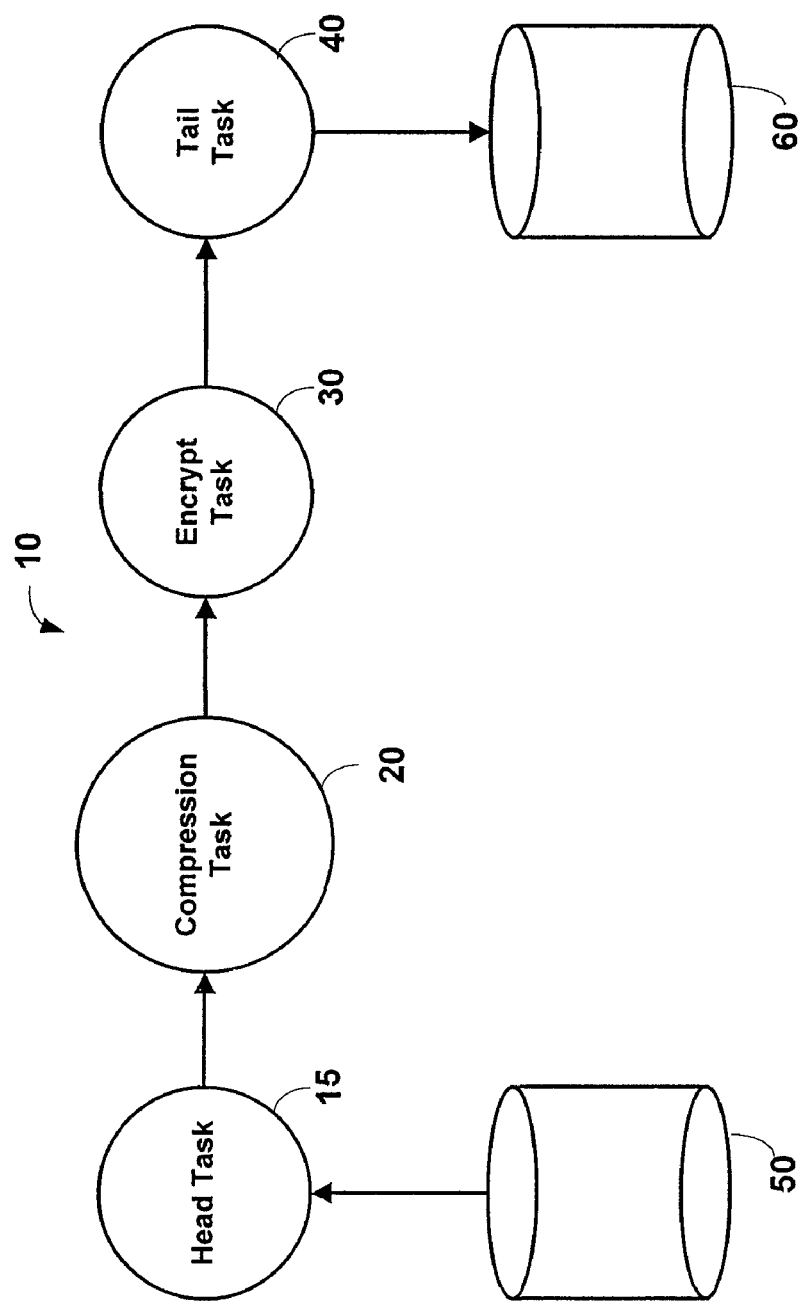
FIG. 2A is a schematic of the DataPipe transfer process on a single computer according to an embodiment of the invention.

From the preceding discussion and FIG. 2A, one can ascertain that a pipeline or DataPipe 10 comprises a head task 15 that generates the data to be archived or transferred from store 50, and a tail task 40 which accomplishes the final task of storing or writing the data to store 60, including archiving or restoring on the data. One or more middle modules 20, 30 may exist, which processes the data by performing actions such as compression, encryption, content analysis, etc. by allocating or not allocating new buffers while doing the processing.

Figure 2B:
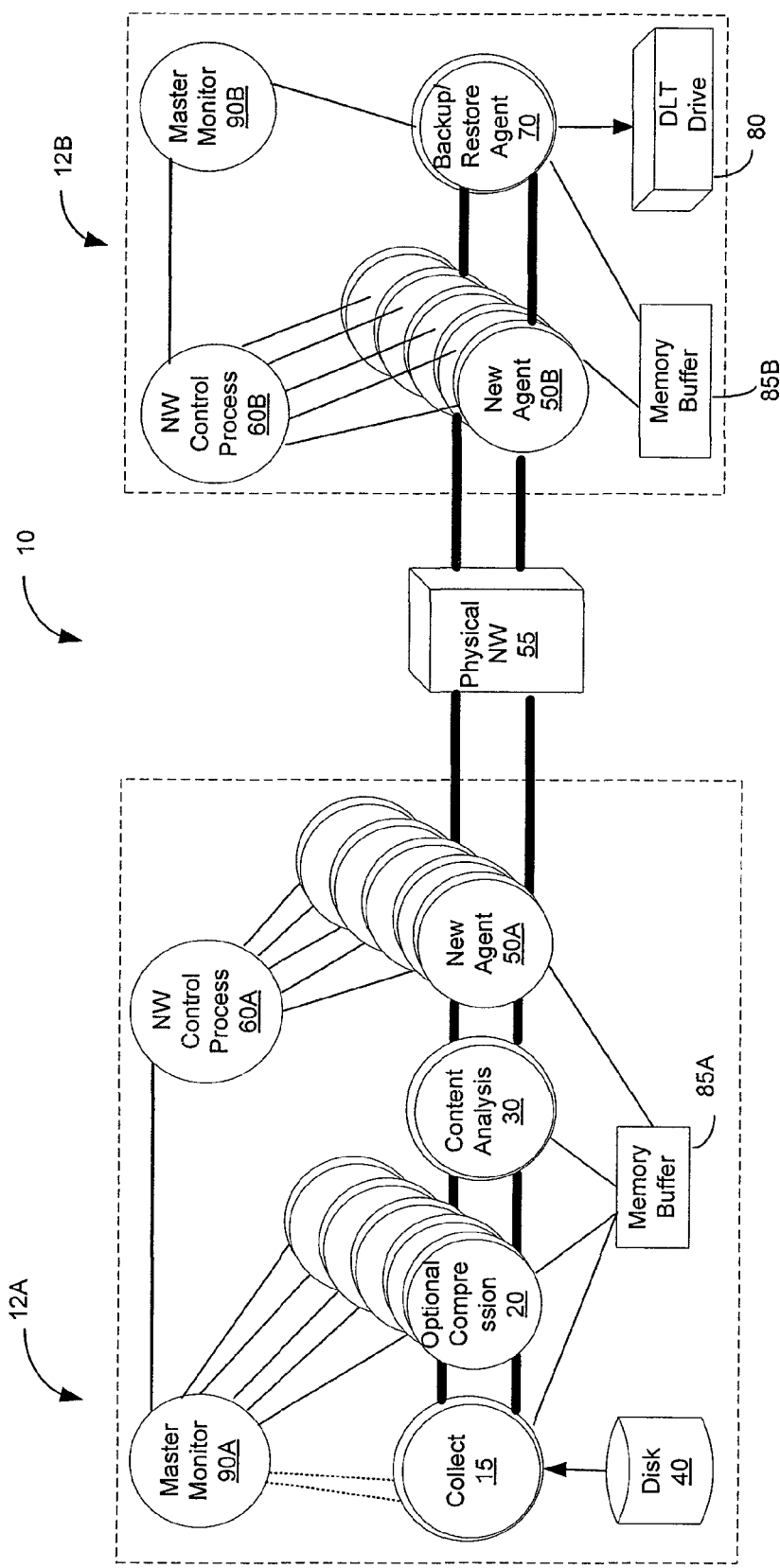
FIG. 2B is a schematic of the DataPipe transfer process on multiple computers according to another embodiment of the invention.

A pipeline on a particular machine can be arranged to provide a feed to another different machine. A schematic diagram is illustrated in FIG. 2B. In this case, the DataPipe resides on more than one computer. This is done with the aid of network agents and control processors 50A, 50B, 60A and 60B. In such cases, the first machine 12A has a head 15 and other modules 20, 30, etc. which comprise middle processes. A cluster of dedicated network agents 50A which send data across to the remote machine 12B via standard network protocols and act as a pseudotail on the first machine. On the remote machine, a cluster of dedicated network reader agents 50B act as a pseudo head, and along with other modules such as middle (not shown) and tail 70, constitute the pipeline segment on that machine.

In addition to the transferring of data from one computer to another, a unique capability of the DataPipe invention is the ability to scale to enable full utilization of the bandwidth of a network, and to fully utilize the number of peripheral devices such as tape drives, or fully utilize other hardware components such as CPUs. The scalability of a DataPipe is achieved by using multiple instances of each task in the pipeline.

For example, multiple head tasks operating in parallel may gather data from a database and deposit it into buffers. Those buffers may then be processed by several parallel tasks that perform a function such as encryption. The encryption tasks in turn may feed several parallel tasks to perform compression, and several parallel tasks may perform network send operations to fully exploit network bandwidth. On the target computer, several network reader tasks may receive data, which is written to multiple tape units by several tasks. All of these tasks on both computers are part of the same DataPipe and collectively perform the job of moving data from the database to tape units. They do this job extremely efficiently by fully utilizing all available bandwidth and hardware allocated to the DataPipe while also minimizing CPU cycles by avoiding unnecessary copying of the data as it moves from one stage of the DataPipe to the next.

FIG. 2B shows the multiple computer case where a single head task (collect process) gathers data from the disk 40 and deposits it into buffers. The buffers are then processed by several parallel instantiations of compression process 20 which upon completion of processing of each buffer for each instantiation sends the process buffer to process 30 which performs content analysis, and sends the processed buffer data to several network agent tasks 50A or instantiations, which perform the network operations to send the data over the physical network 55 where it is received and processed by corresponding network agents 50B on the remote computer 12B and sent to tail backup/restore process 70 for storage or writing to DLT drive 80.

In general, there could be N stages in a given DataPipe pipeline. At each stage of the pipeline, there could be p instances of a given module task. These N stages could all be on the local machine or could be split across two different machines in which case there are network writers and network readers (i.e. pseudo tail and head network agents) which work together to ensure continuity in the pipeline.

Referring to FIG. 2B, each DataPipe has a dedicated memory segment 85 on each machine on which the DataPipe resides. For example, a DataPipe that sends data from machine 12A to machine 12B has two dedicated memory segments, one on machine A and one on machine B. Tasks that are part of this DataPipe may allocate and free buffers within these memory segments. Of course, tasks operating on machine 12A may only allocate or free buffers within the memory segment 85 on machine A and likewise for tasks on machine B. Thus, any of these modules may allocate or free segments of a single large shared memory on each machine dedicated for the use of this particular pipeline.

Buffer Manipulation Primitives

Figure 2C:
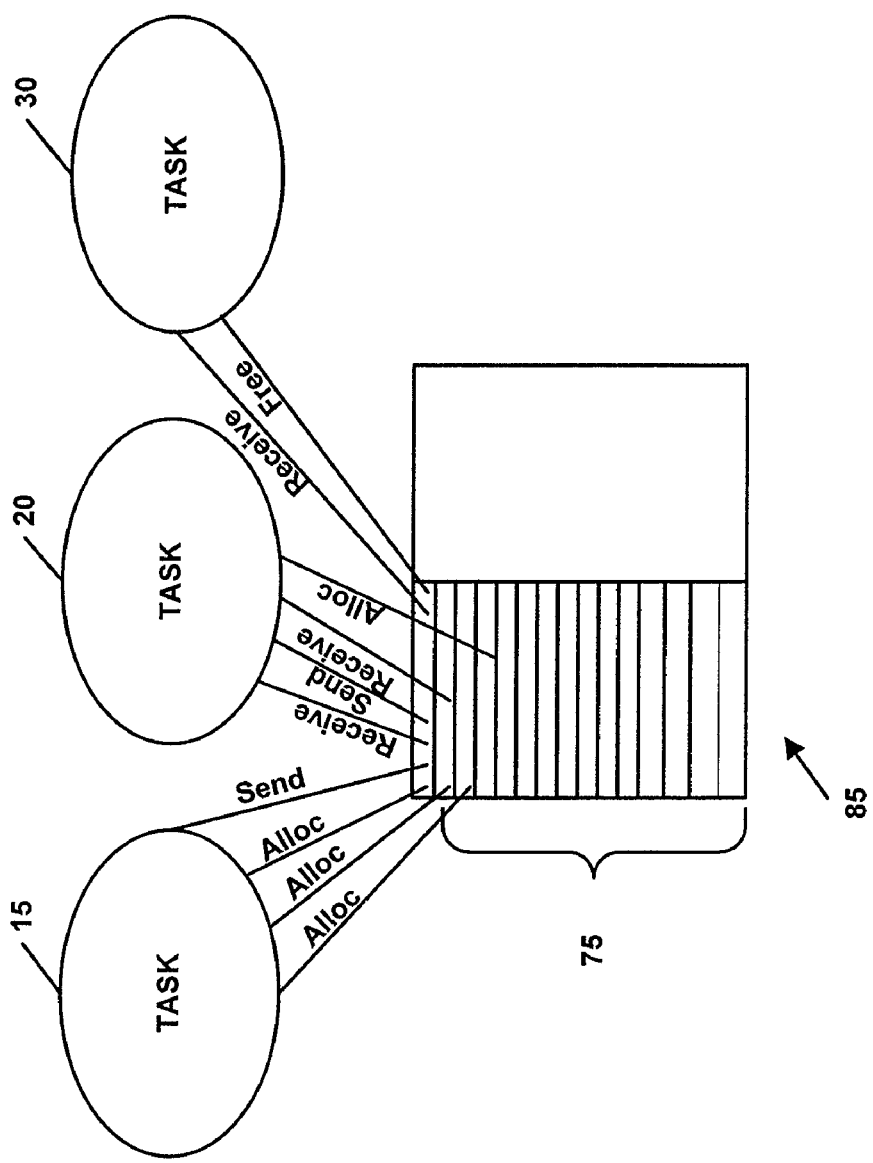
FIG. 2C is a schematic of the DataPipe transfer buffer allocation process from a buffer pool stored in the shared memory according to an embodiment of the invention.

Referring now to FIG. 2C, each task or process (15) that wishes to allocate a buffer does it from a buffer pool 75 stored in the shared memory segment 85 owned by the DataPipe using AllocBuf( ). Each task that wishes to process incoming data from the previous task executes a receive call using ReceiveBuf( ). Each task that wishes to relinquish control of a particular buffer so that the next task can operate on it, performs a SendBuf( ) on that buffer to send it to the next task. Each task that wishes to destroy a buffer and return it into the buffer pool, does so by executing a FreeBuf( ) on that buffer.

Master_Monitor is connected to a predefined port, to enable it to communicate with its peers on other computer systems. Master_Monitor monitors the status of all DataPipes under its control at all times and is able to provide status of the DataPipe to the application software that uses the DataPipe.

Figure 2D:
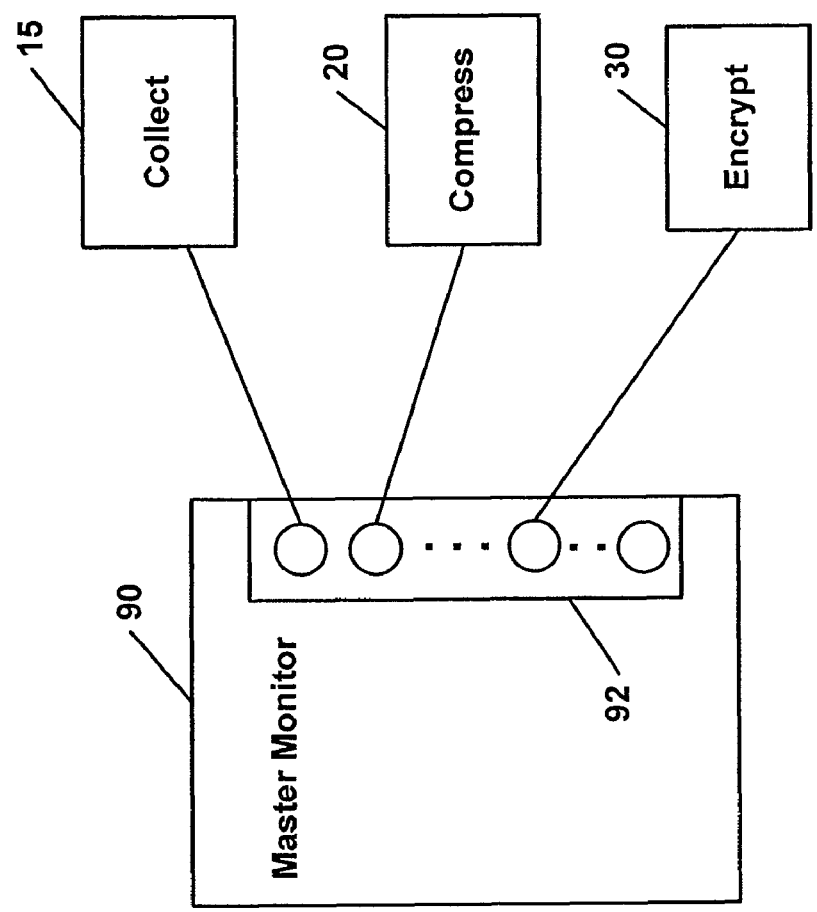
FIG. 2D is a schematic illustrating a controlling relationship of a master monitor process to various attached processes according to an embodiment of the invention.

To accomplish these above tasks, a master manager program called Master_Monitor executes in the preferred embodiment as a daemon on all process machines. The Master_Monitor program "listens" or receives control signal data on a port dedicated to receiving such control data from external processes. In this manner, the Master_Monitor program can serve the requirements of pipeline operations. Master_Monitor functions to monitor status of all pipelines under its control at all times and reports status of the pipeline to all its sub-modules. As shown in FIGS. 2B and 2D, Master_Monitor includes control messaging sockets 92 open to all modules through which it can control or change status of execution of each module. Master_Monitor 90 further includes functions which monitor status and listings of all centrally shared resources (among various modules of the same pipeline) such as shared memory or semaphores or any similar resource. Master_Monitor unless otherwise requested will initiate all modules of the pipeline either by fork( ) or thread_created( ) or a similar OS specific thread of control initiation mechanism. Master_Monitor also permits initiation of a pipeline with proper authentication. This initiator process can identify itself as either a head process or a tail process, which will later attach itself to the pipeline. (Exception is made in the case of a networking module, for this facility. A network process will not be allowed to attach itself as the head or tail of any pipeline.) The Master_Monitor daemon owns and controls the shared storage memory 85 shown in FIG. 2C and can thus permit or deny processes accessed to such memory.

DataPipe Initiation

Figure 3A:
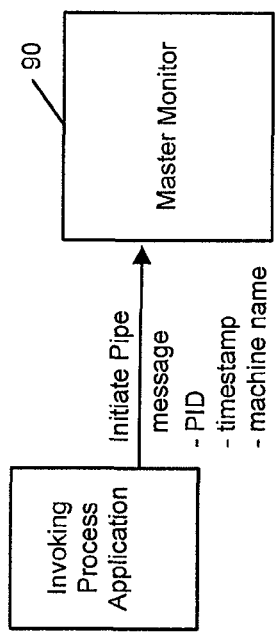
FIGS. 3A-3C illustrate various messages transferred between application processes and the master monitor process according to an embodiment of the invention.

Referring now to FIG. 3A in conjunction with FIGS. 1 and 2A-D, a DataPipe is created by calling Master_Monitor and passing it an Initiate_Pipe message. In this message, parameters such as the DataPipe name, DataPipe component module names, the number of parallel instances for each component, properties of each component (e.g. whether they allocate buffers or not), local and remote machines involved in the DataPipe, direction of flow, nature of the invocation program etc. are passed to Master_Monitor. Note that the term "module" refers to a program that is executed as a task as part of an instance of a DataPipe. Each module may have more than one instance (e.g. execute as more than one task) within a DataPipe.

Figure 3B:
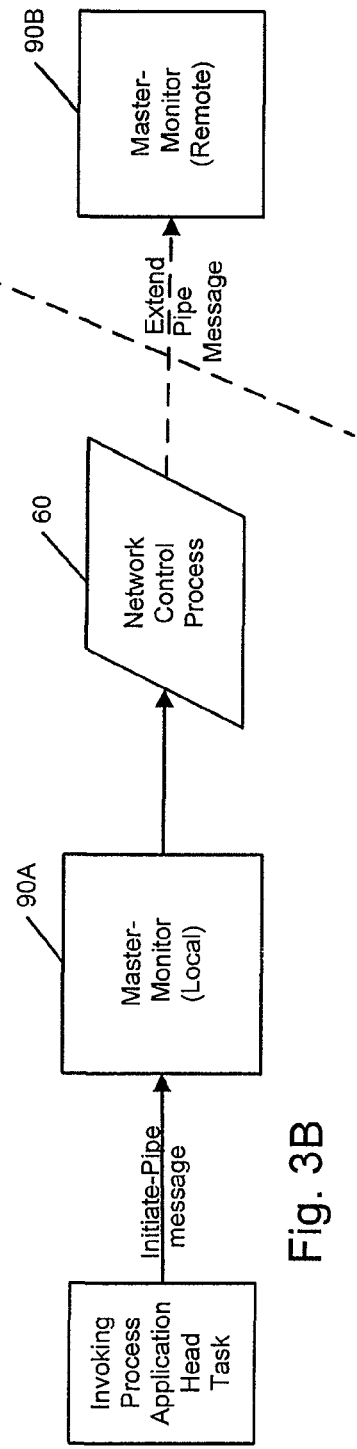
Figure 3C:
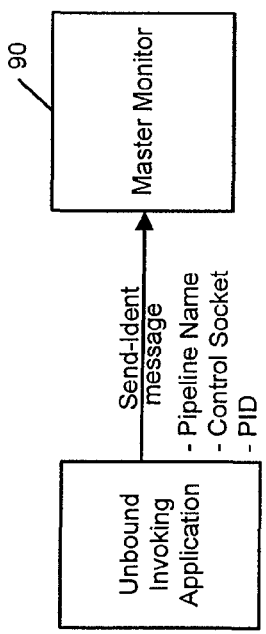

Referring now to FIG. 3B, depending upon the nature of the invocation program, it may be required that the process invoking the DataPipe needs to identify itself to the local Master_Monitor 90A and attach itself to the DataPipe as a head or tail task. In order to operate over a network on two computers, the Master_Monitor 90 initiates a Network Controller Process 60 on the first machine which contacts Master_Monitor 90B on the second machine where this DataPipe is to be completed using an Extend Pipe message. All information required for establishing the second side of the DataPipe, (including DataPipe name, number of processes, local machine name and number of parallel instantiations of particular processes) is passed along with this call so that the DataPipe is completely established across both machines. The Master_Monitor 90B on the second or remote machine, in response initiates the required processes on the second machine including network control process 60B (see FIG. 2B) to initiate network agent processes on receiving machine.

Identification

The process responsible for initiation of the pipeline constructs a name for the pipeline using its own process Id, a time stamp, and the name of the machine where the initiator process is running. This pipeline name is passed along with both the Initiate-Pipe as well as the EXTEND_Pipe message so that the pipeline is identified with the same name on all computers on which it is operating (i.e. both the remote as well as the local machine). All shared memory segments and semaphores (reference numeral 85 of FIG. 2C) attached to a particular pipeline are name referenced with this pipeline name and definite offsets. Hence the process of identification of a specific semaphore or shared memory associated with this pipeline is easy and accessible for all processes, and bound modules (i.e., modules for which control is initiated by the Master_Monitor). Each unbound module (i.e., a module not initiated via Master_Monitor, which attaches itself after the pipeline is initiated) must identify itself to its local Master_Monitor via a SEND_IDENT message shown in FIG. 3C. This message contains the name of the pipeline the unbound module wants to attach itself to, a control socket, and a process/thread id, which Master_Monitor uses to monitor status of this particular module.

Data Transfer Implementation (Allocation: Receive: Send: Free)

Directing attention to FIG. 2C and FIG. 4, buffers are allocated using the call AllocBuf( ) from a common pool of buffers specified in the dedicated shared memory for the particular pipeline. The pool consists of a single large shared memory space 75 with Max Buffers number of equally sized buffers and an 'rcq' structure. The 'rcq' structure illustrated in FIG. 4, contains input and output queues for each stage of the pipeline on that particular machine. Access to shared memory is controlled using a reader writer semaphore.

Figure 4A:
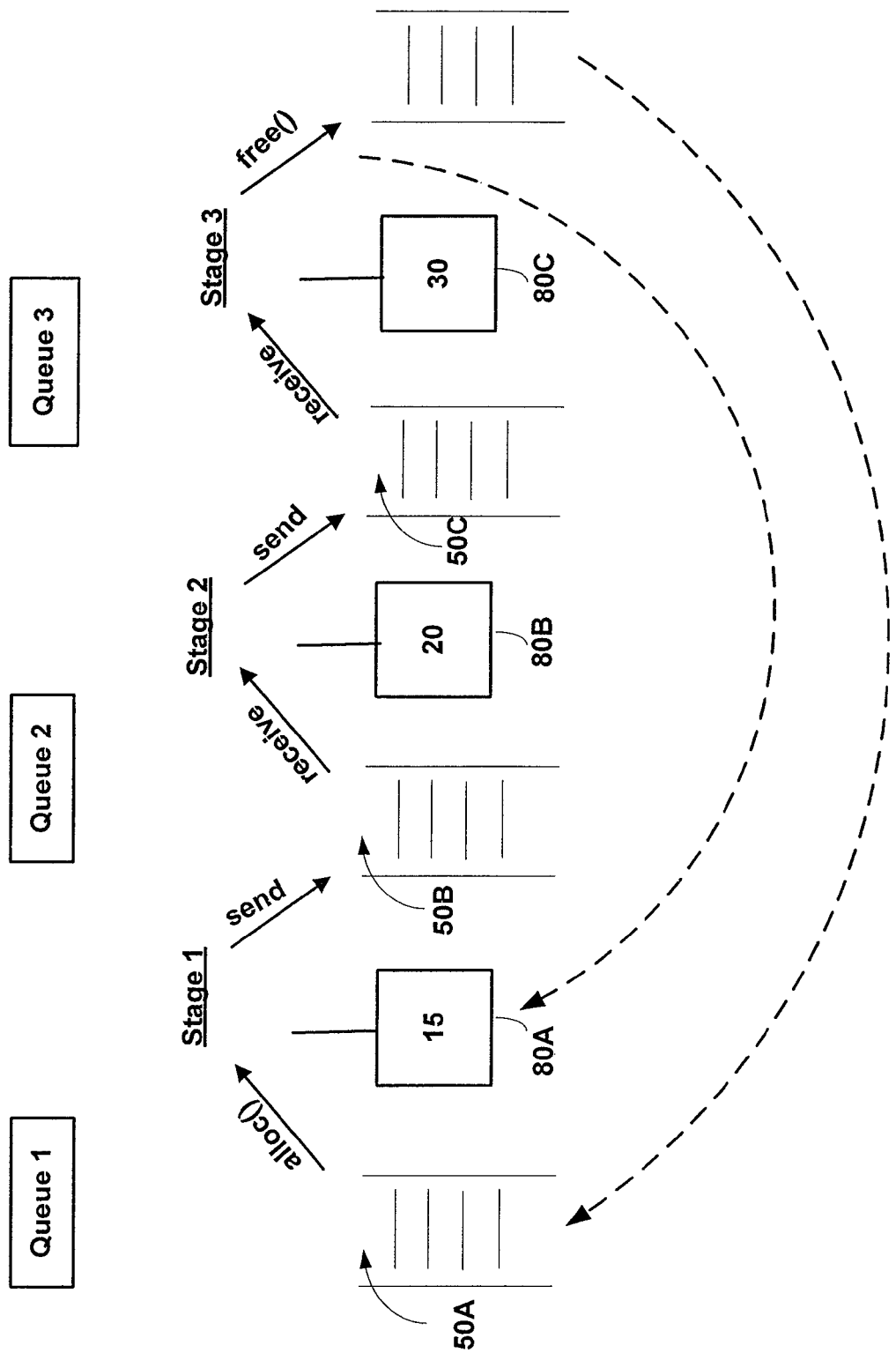
FIGS. 4A-4B illustrate schematics of a module attachment process to shared memory space in accordance with the present invention.

As shown in FIGS. 4A and B, the input queue of an ith stage module is the output queue of the (I-1)th stage module. The input queue of the first module is the output queue of the last module of the pipeline on that machine. Buffer allocation is always performed from the input queue associated with the first stage of the first module or process and a first set of semaphores 50A-D are each uniquely associated with a particular queue in order to track the number of buffers allocated by that queue/module. However, to ensure that no allocation task can unfairly consume buffers, a second set of semaphores 80 A-D is each uniquely associated with a particular module to limit allocation of buffers by each module to a threshold value of Max_Buffers/NA, where NA is the number of allocator modules in the pipeline on this particular machine. These parameters are stored in memory 75 under control of the Master_Monitor program and determines whether any process has exceeded its allocation. This means there could be K unfreed buffers in the system allocated by a single instance of a module H, where K is Max_Buffers/NA. Further allocation by module H will be possible when a buffer allocated by H gets freed.

All FreeBuf( ) calls free their buffers into the input queue of the first module. By the same rule, first stage modules are never permitted to do a ReceiveBuf( ) but are permitted to do AllocBuf( ). On the other hand, tail processes are permitted to perform only FreeBuf( ) and never permitted to perform a SendBuf( ). All other modules can Receive, Allocate, Send, and Free buffers. First stage modules always perform SendBuf( ) after they execute each AllocBuf( ). Note: Any module in the pipeline can allocate an available buffer if it requires to copy data during processing. Normally, however, data is not recopied within a given machine's pipeline segment.

As previously mentioned, each queue 95 is associated with a semaphore 50 to guarantee orderly access to shared memory and which gets triggered upon actions such as AllocBuf( ) ReceiveBuf( ) SendBuf( ) and FreeBuf( ). A second set of semaphores 80, each associated with a particular module in the pipeline, provide a mechanism to ensure that no bottlenecks occur. Dedicated network agents thus map themselves across any network interface on the system, as long as data propagation is ensured. The number of network agents per pipeline is a configurable parameter, which helps this mechanism exploit maximum data transfer bandwidth available on the network over which it is operating. A single dedicated parent network thread/process monitors performance and status of all network agents on that particular machine for a particular pipeline.

Referring again to FIG. 4A, the process flow of buffer allocation, sending, receiving, and freeing of buffers by processes in the pipeline and their associated semaphore indices is now described. Upon allocation of a buffer by first stage module 15 via the AllocBuf( ) command, the value of semaphore 50A associated with queue 1 is decremented from an initial value $S_0$. Furthermore, second semaphore 80A which represents the allocator index for this particular module (module 15) which performs the allocation is also decremented from an initial value S.sub.1. Information indicating the module which performed this allocation is included within each buffer. The module 15 then sends the buffer to queue 2 where it is received by module 20 via the command ReceiveBuf( ), taken off of input queue 2 and assigned to the module which performed the call (i.e. module 20). Upon completion of processing on this buffer, module 20 passes forward the buffer by means of the SendBuf( ) which forwards the buffer to the destination queue (queue 3). Module 30 then performs a ReceiveBuf( ) of the buffer on its input queue (i.e. queue 3) and upon processing of the data, performs a FreeBuf( ) operation. As part of the FreeBuf( ) operation, semaphore 50A associated with queue I is incremented. Similarly, semaphore 80A which is the allocator index of module 15 (i.e. the module who allocated this particular buffer) is also incremented. Information relevant to this operation is always available with the buffer with which one is performing the free operation by virtue of shared memory area 85. In the preferred embodiment, the first set of semaphores (50A-50C) associated with the input/output queues of a particular stage may have a threshold value of up to max_buffers which is indicative of the maximum number of buffers which can be allocated in the pipeline. However, the semaphores 80A-C each uniquely associated with a particular module of a particular stage has an associated value of only max_buffers/NA, where NA (number of allocators) is greater than or equal to 1. Accordingly, since the semaphore value for either semaphores 50A-C and 80A-C can not be less than 0, this insures that all allocator modules may obtain a fair share of the available total number of input buffer.

Figure 4B:
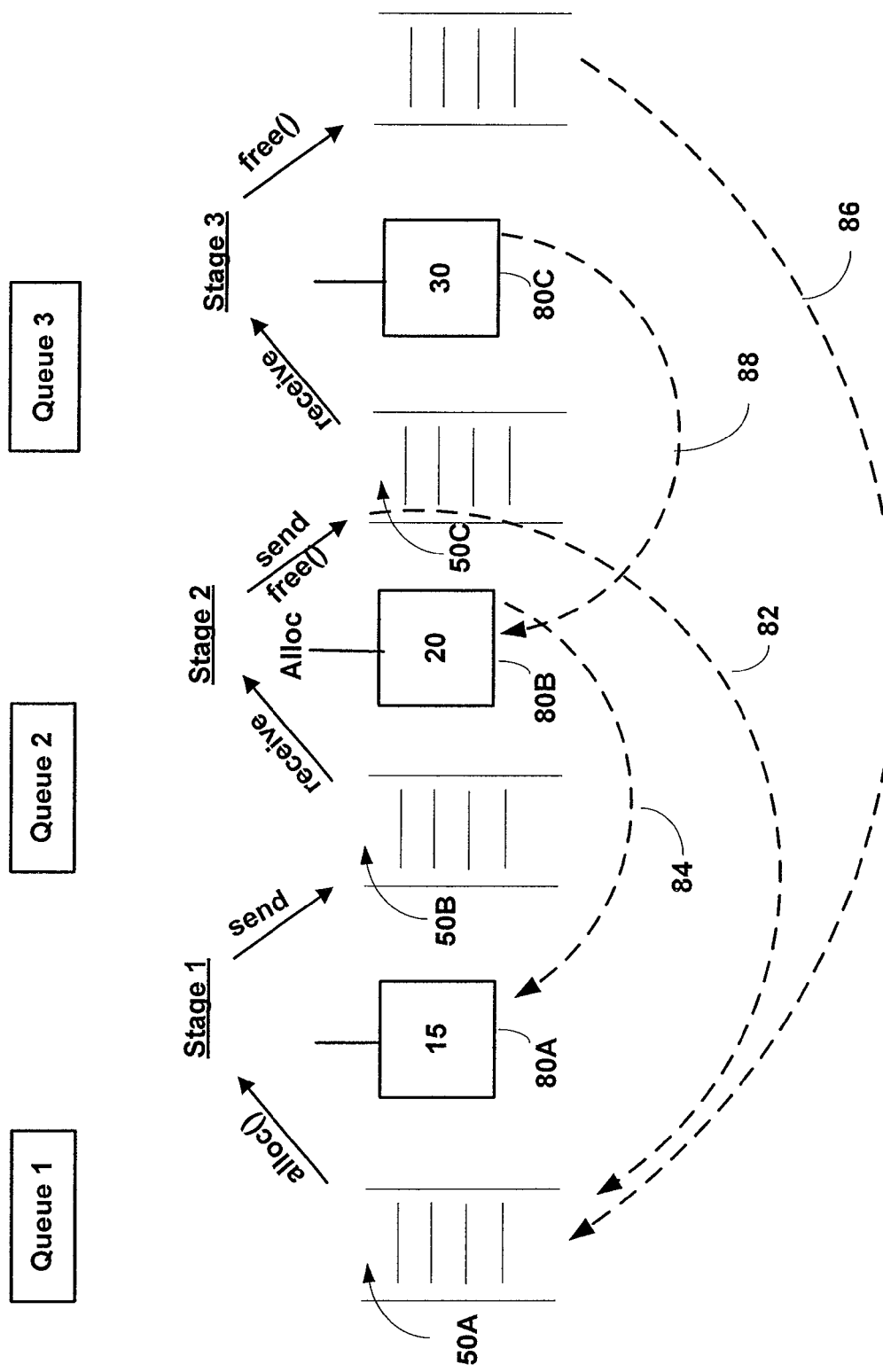

FIG. 4B illustrates the situation where at least two modules are operable to allocate buffers. FIG. 4B is similar to FIG. 4A, with the exception that both modules 15 and 20 are operable to allocate buffers. Module 15 allocates the first buffer and decrements semaphore 50A. Similarly, semaphore 80A is also decremented. The buffer is then sent via the send command from module 15 from queue 1 to queue 2 where module 20 receives the buffer and begins processing. In this instance however, such as during compression, where a compression module may require allocation of additional buffers to perform its processing, module 20 performs an Alloc( ) to allocate a new buffer from the pool of available buffers in shared memory 85. Performance of the Alloc by module 20, thus causes semaphore 50A associated with queue 1, to be further decremented. Furthermore, the semaphore 80B associated with module 20 is also decremented, since module 20 is the allocator of the new buffer. Upon processing, the original buffer allocated by module 15 is freed via the FreeBuf( ) operation of module 20 at stage 2 and semaphore 50A value is correspondingly incremented. In addition, module 20 increments semaphore 80A associated with module 15 as a result of performance of the FreeBuf( ) operation, as indicated by arrow 84. Module 20 then performs the SendBuf( ) to send the new buffer to module 30 at queue 3, where module 30 then receives the new buffer, performs its processing, and subsequently frees the buffer which increments semaphore 50A, as shown by arrow 86. As part of the FreeBuf( ) operation, module 30 also increments semaphore 80B associated with module 20 as shown by arrow 88. In this manner, bottlenecks occurring within the pipeline are prevented, while maintaining proper and efficient data throughput.

Attachments

As the identification process is completed, all modules attach themselves to a specific shared memory space segment that is shared among modules on that machine for this particular pipeline. This shared memory segment has many data buffers, input queues for all stages on the pipeline, and their initial values. Each module identifies its own input queues and output queues depending on the stage that module is supposed to run at, and initial queue (first stage) is populated with number of data segments for sharing on this particular pipeline. Also all modules attach themselves to an allocator semaphore array, which controls the number of buffers allocated by a specific module that can be active in the pipeline.

Data Integrity

Figure 5B:
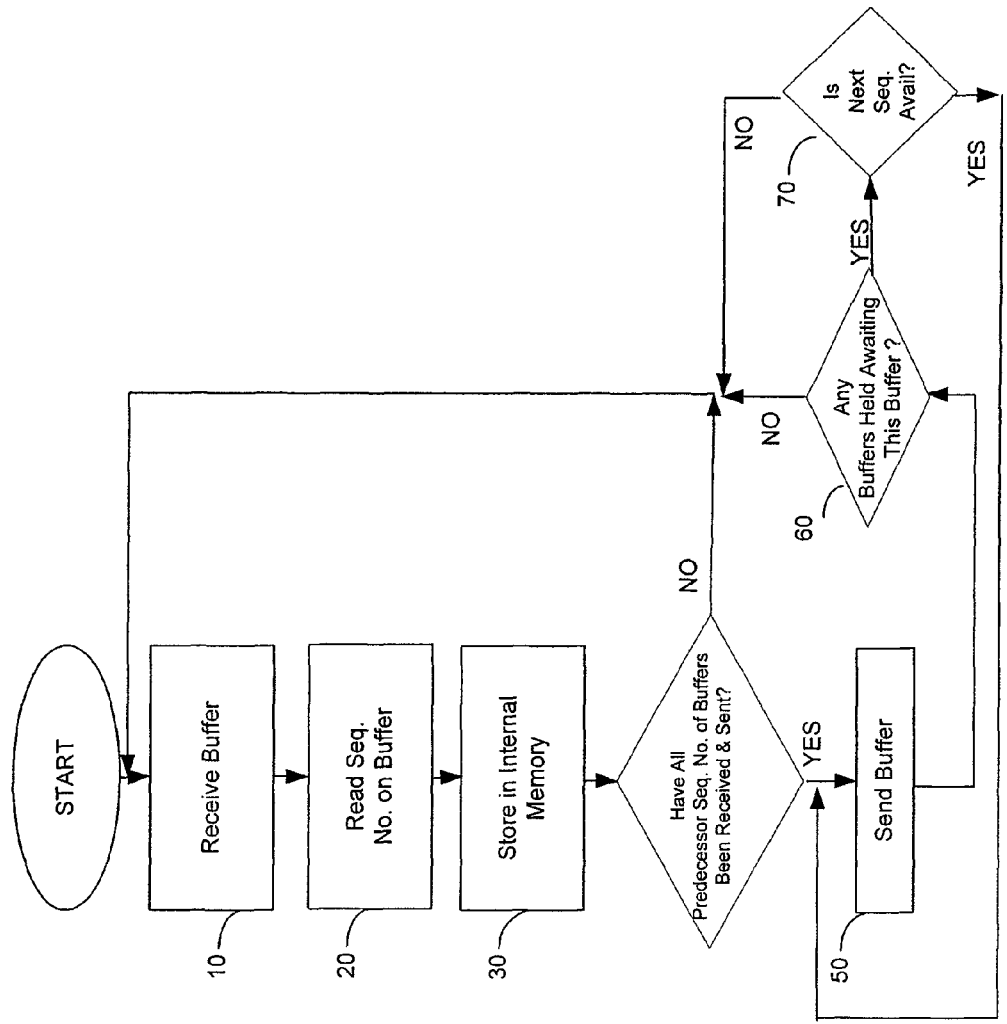
FIGS. 5A-5B depict flow diagrams of the operation of sequencer and resequencer processes according to the present invention.
Figure 5A:
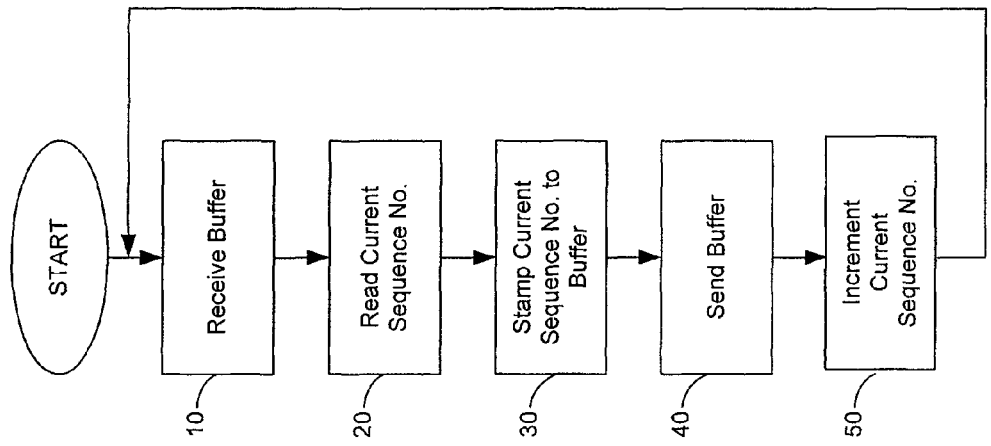

Integrity of the data passed along and the sequencing of data are maintained in part by a pair of special purpose modules termed sequencer and resequencer processes. FIGS. 5A and 5B provide diagrams of the operation of the sequencer and resequencer processes respectively. Referring to FIG. 5A, the sequencer process receives each buffer (module 10), reads the current sequence number stored in memory (module 20), and then stamps the buffer with the current sequence number (module 30) and sends the stamped buffer to the next stage for processing (module 40). The current sequence number is then incremented (module 50) and the process is repeated for each buffer received by the sequencer. The resequencer is operative to receive all input buffers and store them internally and wait for the required predecessor buffers to show up at the input queue before forwarding them all in the next sequence to the next stage of processing.

The purpose of the resequencer is to enforce the proper ordering of buffers. It insures this by making sure that it sends buffers to the next pipeline module in sequence number order. If a buffer is received out of order, it is held by the resequencer until all processor buffers are received and send to the next module. In this way, buffer ordering is guaranteed and buffers are never held longer than necessary. These steps are depicted in FIG. 5B. Note however, that when there is only one instance of a module present at any particular stage, by virtue of the queuing mechanism available with all input queues, data sequence in the right order is insured.

Hence, in the preferred embodiment, all data pipe transfers employing multi-instance stages via the sequencer/resequencer processes ensure that the input sequence of sequence numbers are not violated for each instance of the module. Further, the restriction that all modules of a specific multi-instance stage should be of the same type eliminates the chances for preferential behavior.

Fairness

The concept of fairness means that each task will be assured of getting the input buffers it needs to operate on without waiting longer than necessary. Fairness among the modules in a given DataPipe where no stage of the pipeline has more than one instance is automatic. As the tail task frees a buffer it enters the free buffer pool where it may enable the head task to allocate it and begin processing. All tasks in the DataPipe operate a maximum speed overlapping the processing done by other tasks in the preceding or following stage of the pipeline.

If a DataPipe has stages consisting of parallel instances of a task, fairness among those tasks is assured by using an allocator semaphore which counts from Max_Buffers/NA (where NA is the number of allocators for this DataPipe on this particular machine) downward to zero. All FreeBuf( ) increment this semaphore back, however, there could be only Max_Buffers NA buffers allocated by any allocator module in this DataPipe. This ensures that all allocators get a fair share of the available total number of input buffers. If a particular process attempts to allocate more buffers than it is allowed, the master_monitor process prevents such allocation, causing the process to either terminate or wait until a buffer currently allocated to the process becomes freed thereby incrementing the semaphore back up to allow the process to allocate another buffer.

Control Messages

All instances of all modules have a control socket to Master_Monitor over which control messages are exchanged. All network readers/writers have an analogous control socket to their parent network agent. The parent network agent itself has a control socket to Master_Monitor. Each module periodically checks its control socket for any messages from Master_Monitor. Critical information such as a STOP_PIPE message is passed to Master_Monitor via this mechanism.

Status Monitories

Each module initiated by Master_Monitor on a given machine is monitored by either a parent network process (in the case of network reader or writer), or by Master_Monitor itself, for states of execution. In case any module is reported as having terminated abnormally, Master_Monitor identifies this exception, and signals all the modules on that particular pipeline to stop. This is done by means of control messages through control sockets as described previously. Upon safely stopping all modules pertaining to this particular pipeline, it signals the remote machine's Master_Monitor to stop the remote side of this particular pipeline and the entire pipeline is shut down safely by means of control message signaling.

Implementation

In a preferred embodiment, the DataPipe functions and processes are implemented as software function in the higher level 'C' program language on Sun Solaris or HP-UX operating systems and incorporated into Release 2.7 of CommVault System's Vault98 storage management product.

Figure 6:
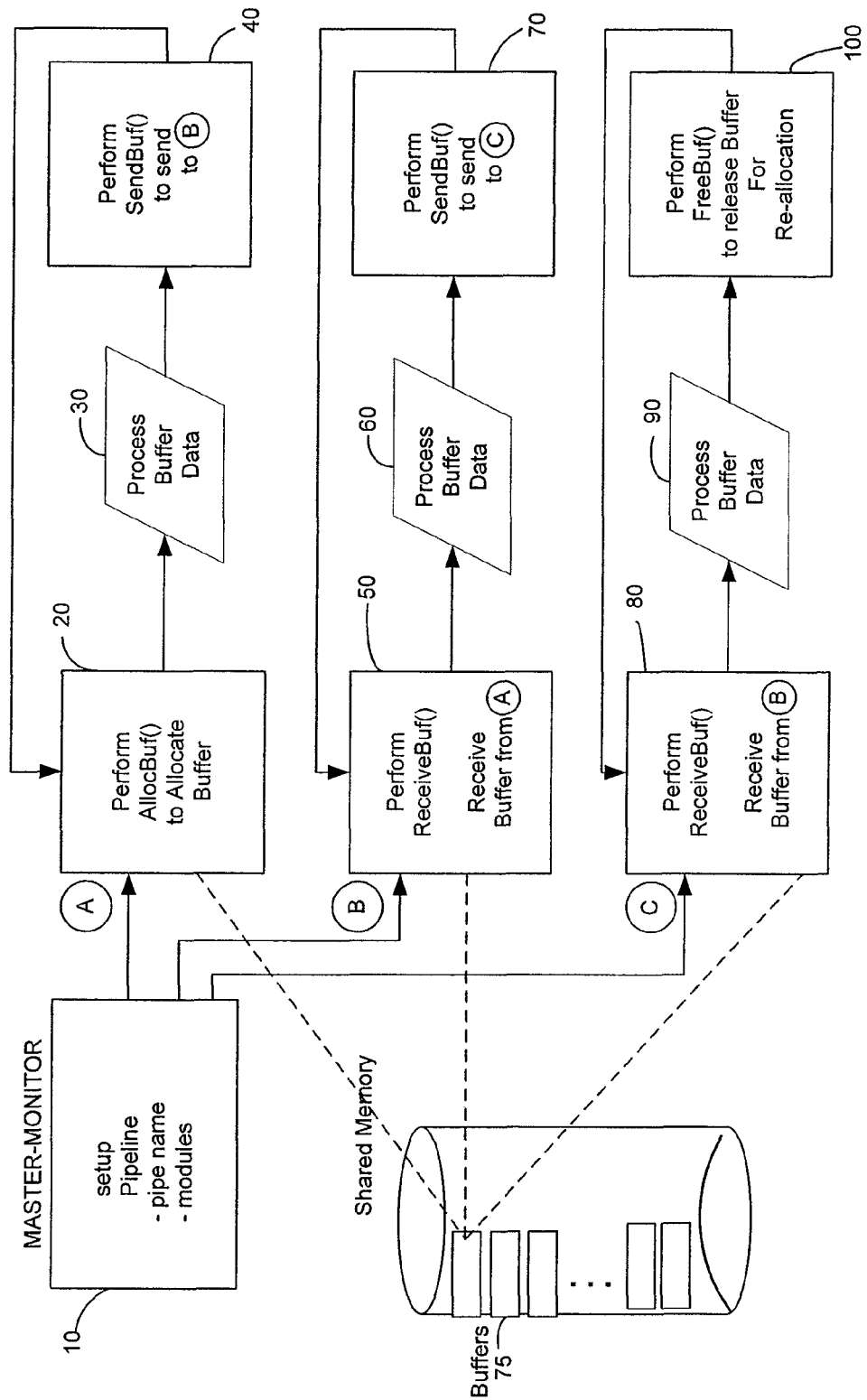
FIG. 6 depicts an exemplary data transfer flow among various processing stages within the DataPipe according to the present invention.

FIG. 6 is an illustrative example of the sequence of primitive commands used to set up a DataPipe. The DataPipe is then used to process data in three modules named A, B and C.

To set up the DataPipe the Master_Monitor is called and provided with the name of the DataPipe and the names of the modules that will use the pipe (module 10).

Master_Monitor (Initiate_Pipe(Sample_pipe, A, B, C)).

Within the logic of module A, Alloc_Buf( ) function is then called to obtain a buffer (20). The logic of module A may perform any actions it wants to fill the buffer with useful data. When it has completed its processing of the buffer (30), it calls SendBuf( ) to send the buffer to module B for processing (40). Module A then repeats its function by again calling Alloc_Buf( ) to obtain the next buffer.

The logic of module B calls ReceiveBuf( ) to obtain a buffer of data from module A (50). It then operates on the buffer by performing processing as required (60). When it is finished with the buffer it calls SendBuf( ) to send that buffer to module C (70).

Module B then repeats if function by again calling ReceiveBuf( ) to obtain the next buffer from module A.

Module C obtains a buffer of data from module B by calling ReceiveBuf( ). When it has completed its processing of the data in that buffer (90), it calls FreeBuf( ) to release the buffer (100). Like the other two modules, it loops back to receive the next buffer form module B.

The primitives used to allocate, free, send, and receive buffers are synchronized by the use of semaphores. This ensures coordination between the modules so that the receiving module does not start processing data before the sending module has finished with it. If no buffer is available, the AllocBuf or ReceiveBuf primitives will wait until one is available. All three modules operate in parallel as separate tasks. The order of processing from A to B to C is established in the initial call to Master_Monitor that established the DataPipe.

Figure 7:
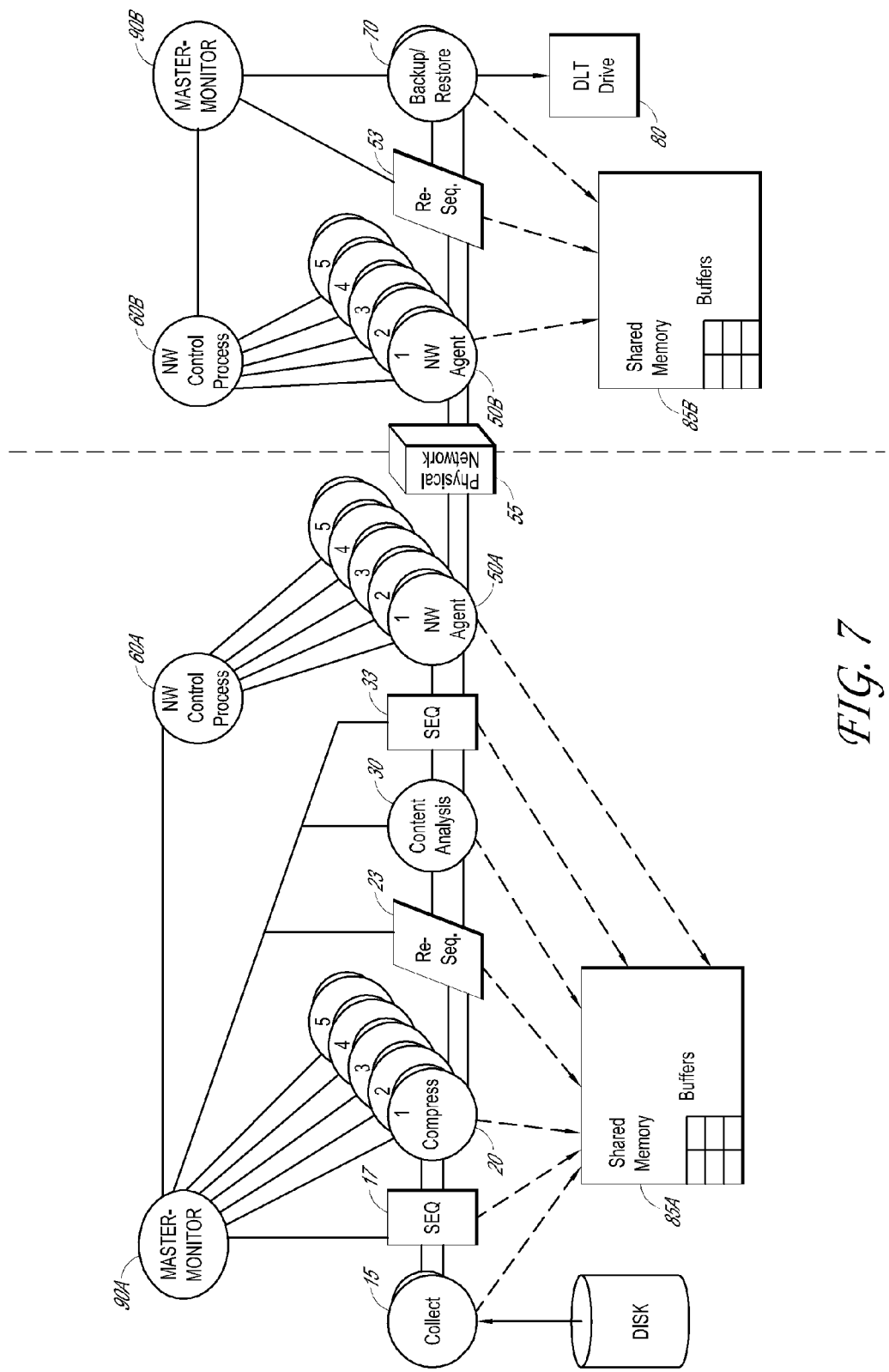
FIG. 7 illustrates a data pipeline transfer process on multiple computers having processes with multiple instantiations according to an embodiment of the present invention.

Referring now to FIG. 7, there is shown another embodiment of the DataPipe apparatus as it is used within Vault98 to provide a high speed path between a "client" system containing a large database that is being backed up to the "CommServ" server and stored as archive files on a DLT drive. Everything on the collect side, of the physical network are part of the client software configuration, whereas everything on the DLT drive side of the physical network are part of the server software configuration. The "collect" activities on the client prepare data to be sent over the DataPipe to the CommServ.

FIG. 7, which is similar to FIG. 2B, depicts a two computer configuration where a header task 15, identified as a collect process, is initiated via Master_Monitor daemon 90A on the first computer. Collector 15 retrieves data from the disk and allocates the buffer from the shared memory 85A for processing the data to be transferred. Collector 15 then sends the data to the compression process 20 which functions to compress the data as it moves over the pipe. As shown in FIG. 7, multiple instantiations of compression module 20 are provided at this stage for effectively processing the data as it flows across the system. Accordingly, sequencer 17 initiated by Master_Monitor 90A is coupled directly between collect module 15 and compressor module 20 to stamp each of the buffers with the sequence number as described previously. Re-sequencer module 23 is coupled to the output queue of the compression module 20 instantiations to properly reorder and re-sequence the buffers sent from the instantiations of module 20 to content analysis module 30. Content analysis module 30 then receives the buffers from re-sequencer 23, processes the data, and sends the buffers to sequencer 33, which again stamps the buffers and sends them to multiple instantiations of network agents 50A for processing across the physical network via standard network protocol such as TCP IP, FTP, ICMP etc. Network agents 50B are instantiated by network control processor 60B in communication with remote Master_Monitor 90B to provide multiple network agent instantiations, where each agent on the remote side uniquely corresponds and communicates with corresponding agent on the local side. In the preferred embodiment, each network agent 50A on the local side performs a copy of the data in the buffer for transfer over the physical network to its corresponding network agent 50B on the remote side and then performs a free buffer function call to free the buffers associated with shared memory 85A for reallocation. On the remote side, the network agent 50B receives the data transferred over the network and acts as a header on the remote side to allocate each of the buffers in shared memory 85B. These buffers are then sent to re-sequencer 53 which stores buffers received in internal memory until each of the predecessor buffers are received, and then forwards them to the backup restore process 70 via the SendBuf( ) function. The backup/restore process then functions to write the contents of each of the buffers received to DLT drive 80, and upon completion, frees each of those buffers to permit further reallocation in the buffer pool and shared memory 85B. As one can see, this pipeline could be set up over any high speed network, such as ATM, FDDI, etc. The pipeline is capable of utilizing entire practical bandwidth available on the physical network by means of multiple network agents. In cases where real high speed networks are available (networks which have transfer rates higher than DLT drives), multiple pipelines are set up, to utilize resources available to the full extent.

Salient Features

From the foregoing discussion, numerous advantages of the data pipe pipeline data transfer system using semaphore signaled shared memory to produce a general purpose, flexible data transfer mechanism are apparent. Included among these advantages are:

1. Its flexible nature—the modules that are plugged into a pipeline can be easily changed based on the application.
2. It allows for having multiple instances of a given module running in a given stage of the pipeline. This allows for parallelism over and beyond what the pipeline already provides.
3. It provides a well-defined mechanism for startup and shutdown of a pipeline and includes housekeeping and cleanup mechanisms provided via Master_Monitor.
4. It allows the application control over the amount of network bandwidth it wants to take advantage of. It is easily possible to take complete advantage of a wide-band transport mechanism simply by increasing the number of network agents.
5. It provides built-in scheme for fairness among modules. In other words, no single module can retain all the input buffers, or no single instance of a multi-stage module can keep the other instances from operating.
6. It allows easy integration with a 3rd party software by virtue of the fact that the DataPipe provides for any module to attach itself as an unbound end-point (head or tail).
7. It allows for easy check pointing by virtue of a tail-head socket connection.

However, it should be remembered that shared memory on a particular machine is not shared among various other machines. Thus, we are not exploiting implicit results of a distributed shared memory, but doing data transfer, only on a demand basis, discarding all weed buffers, with selective copy, for best performance on a data transfer paradigm. Thus, the invention described herein represents a real data transfer system rather than a commonly seen distributed shared memory paradigm.

Figure 8:
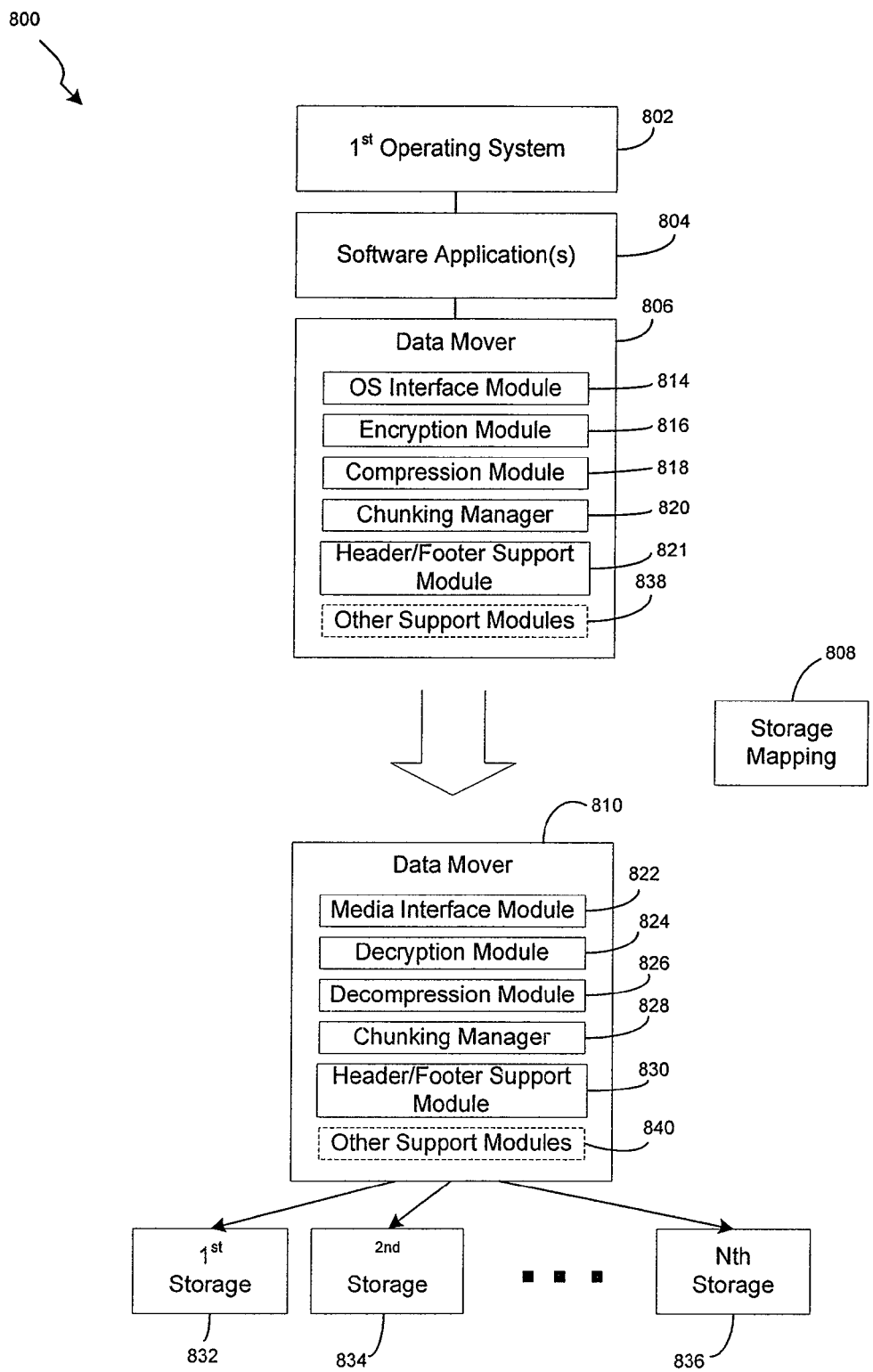
FIG. 8 is a diagram illustrating a modular data and storage management system that operates according to principles of the present invention.

FIG. 8 is a modular data and storage management system 800 that operates according to principles of the present invention. A first operating system 802 is illustrated that supports a software application(s) 804 that is used for storing and/or retrieving data. For ease in understanding the principles of the present invention, FIG. 8 is illustrated with data being stored. Initially, data is moved from the software application 804 to a data mover 806 where a storage mapping module 808 is used to determine where the data is to be sent and in what format. The data is then sent to a data mover 810 before it is stored in storage media 812.

The data mover 806 includes an operating system interface module 814 that interacts with an encryption module 816, a compression module 818 and a chunking manager 820. A header/footer support module 821 is used to record information that indicates what format the data has been placed into before moving to the data mover 810. The storage mapping 808 examines the data to determine where it will be sent. In the example of FIG. 8, the data is sent to the data mover 810 where a media interface module 822 interacts with new data that is received at the data mover. The data mover 810 includes a decryption module 824, a decompression module 826, a chunking manager 828, and header/footer module 830. Any one or more of these components may be activated to alter the format of data that has been received at the data mover 810. The data mover 810 then moves the data to the storage media 812, such as a first storage media 832, a second storage media 834, or an nth storage media 836.

As data is moved from the first operating system 802 to the storage media 812, a data pipe is created for passage of the data. For example, the data mover 806 may be considered to create a data pipe between the data mover 806 and the data mover 810. Although the data that is being transmitted could be parsed into multiple chunks by the chunking manager 820, and sent to different types of storage media 812, the data pipe may be considered to be the same data pipe for the data that is being sent. For example, if the data that is to be sent from the first operating system 802 to the storage media 812 is data that begins in a text format, changes to streaming video format, and then to audio format, the data could be separated into chunks which should be stored in different storage media and in different formats. However, the data will be considered to have traveled through a single data pipe. Each chunk of the data that is sent to the storage media 812 causes the storage management system 800 to identify the characteristics of the chunk that has been sent as well as characteristics of the next chunk that is to be sent, thereby allowing the storage management system 800 to keep the data pipe that has been established.

Any portion of the storage management system 800 may select the format for the data. For example, the software application 804 may select whether to encrypt, to compress, or to chunk data that is to be sent. The storage mapping 808 may also be the component that determines whether to encrypt, to compress, or to chunk the data. Also, the data mover 806 may make the decision of whether to encrypt, to compress, or to chunk the data. Numerous other decisions may be made by any one of these three components, such as the type of header, the transmission protocol, or other information necessary to transmit data from the first operating system 802 to the storage media 812.

The data movers 806 and 810 are illustrated having other support modules 838 and 840, respectively. These other support modules 838 and 840 are illustrated in dashed lines to indicate that they may or may not be present.

Figure 9:
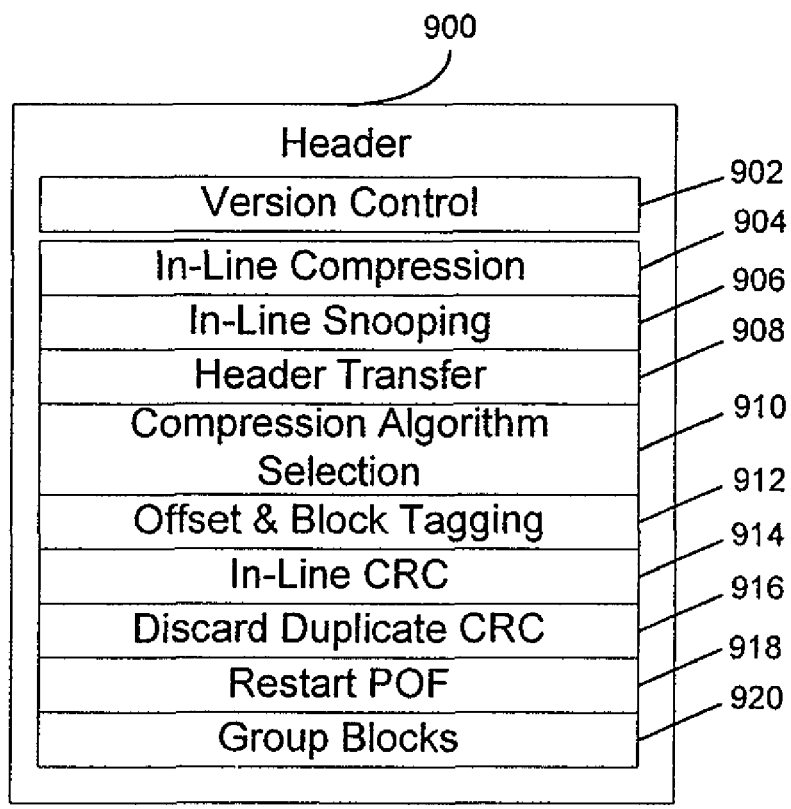
FIG. 9 is diagram illustrating an exemplary header that is typically placed at the beginning of chunks of data that are sent across the storage management system.

FIG. 9 is an exemplary header 900 that is typically placed at the beginning of chunks of data that are sent across the storage management system 800. The header 900 includes various pieces of information, such as a version control 902. The version control 902 is on the structure and helps in data format versioning of the data that is being transmitted on the storage management system 800. An in-line compression module 904 is included to assist in the compression of data in the transit of data from one location to the next, and is an optional feature.

Another optional feature is an in-line snooping module 906 that is used for such purposes as anti-virus checking, as well as other security purposes. A header transfer module 908 is included to transfer special headers with the portions of data that include the header 900. A compression algorithm selector 910 is included to select the appropriate compression algorithm for the data that is about to be sent or has just been received. An offset and block tagging module 912 is included for purposes of tagging the offset block number, or identifier, of the data. The block number and offset of the data is useful in determining where to locate data that has been stored. An in-line CRC (cyclic redundancy check) generator 914 may also be included in the i-tag header 900. If the in-line CRC 914 is included, a discard duplicate CRC module 916 may be included for discarding duplicate CRC blocks that have been generated by the in-line CRC 914 generator. Also included is a restart from point of failure (POF) module 918 that is able to continue transmission of data regardless of failures in the transmission. Also, group blocks module 920 can be included to group multiple blocks of data together for more efficient data transfer.

Figure 10:
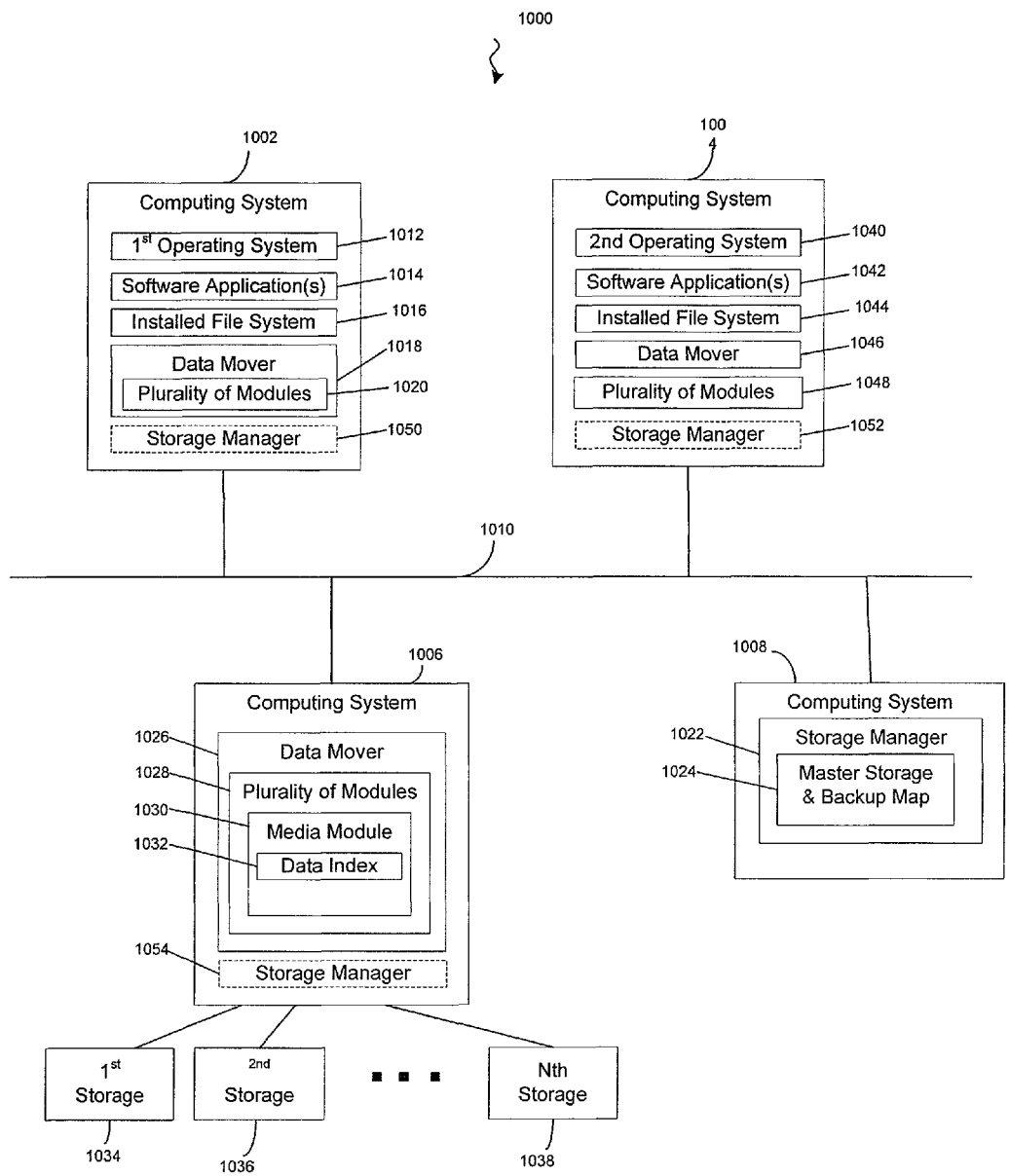
FIG. 10 is an exemplary modular data and storage management system.

FIG. 10 is an exemplary modular data and storage management system 1000. The storage management system 1000 includes computing systems 1002, 1004, 1006, and 1008 that interact across a network 1010, such as an ether net network. The computing system 1002 includes a first operating system 1012 that interacts with software application 1014. The software application 1014 may be a single or multiple applications which interact with an installed file system 1016. When data is to be moved from the computing system 1002, the installed file system 1016 interacts with a data mover 1018 which formats the data into a plurality of modules 1020. The data mover 1018 interfaces with the computing system 1008 to get information from a storage manager 1022 concerning storage location. This information is contained in a master storage and backup map 1024. Upon receipt of the appropriate information from the computing system 1008, the data mover 1018 may transmit the data to the computing system 1006 where it is received at a data mover 1026.

The data mover 1026 includes a plurality of modules 1028, a media module 1030, and a data index 1032. The plurality of modules 1028 allows the data mover 1026 to store the data in a first storage media 1034, a second storage media 1036, down to an nth storage media 1038. The data that is sent from the computing system 1002 to the computing system 1006 may be compressed multiple times before being stored in one of the storage media 1034, 1036, 1038.

In addition, the computing system 1004 may transmit data to be stored. The computing system 1004 has a second operating system 1040, software application(s) 1042, an installed file system 1044, and a data mover 1046, having a plurality of modules 1048. As described in relation to the header 900, data is transmitted in various formats, and various portions of the storage management system may determine which formats to implement for the particular portion of the data transmission.

Of note, the computing systems 1002, 1004, and 1006 may include, as shown in dashed lines, respective storage managers 1050, 1052, and 1054. In this embodiment, the computing system 1008 may no longer be required.

Figure 11:
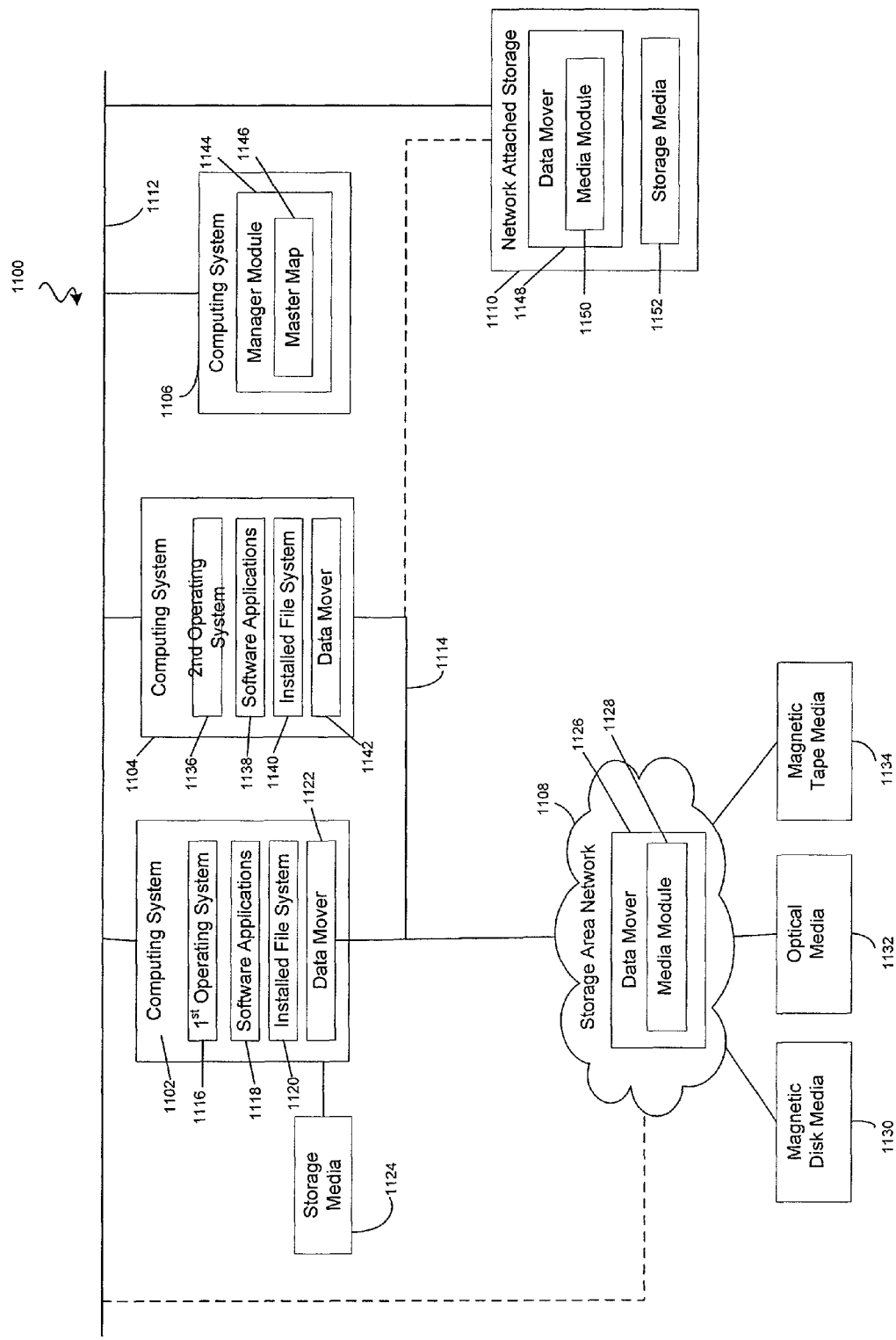
FIG. 11 is a diagram illustrating an exemplary embodiment of another modular data and storage management system.

FIG. 11 is an exemplary embodiment of another modular data and storage management system 1100. The storage and management system 1100 includes a computing system 1102, a computing system 1104, and a computing system 1106. The computing systems 1102, 1104 and 1106 interact to store data in either a storage area network 1108 or a network attached storage 1110. A network 1112 is provided for communications with the network attached storage 1110, while another network 1114 (typically, a high speed fibre network) is provided for communication with the storage area network 1108. For example, the computing system 1102 may transmit data by using a first operating system 1116 that supports software applications 1118 which interact with an installed file system 1120 to transmit data to a data mover 1122. The data mover 1122 may interact with a storage media 1124 to store data from the computing system 1102. The data mover 1122 may also transmit data to a data mover 1126 of the storage area network 1108. However, in making the decisions to send data to the storage area network 1108, the computing system 1106 is typically accessed to get information from a manager module 1144 to access a master map 1146 for determination for the location of transmission of the data. A media module 1128 of the storage area network 1108 determines whether the data will be saved to a magnetic disk media 1130, an optical media 1132 or a magnetic tape media 1134. In addition, the media module 1128 tracks migration of data between the various storage media 1130, 1132, and 1134.

The computing system 1104 is illustrated as including a second operating system 1136, and software applications 1138 that interact with an installed file system 1140. The installed file system 1140 may receive data from the software applications 1138 and transmit the data to a data mover 1142, where detailed information concerning transmission of the data is found in the computing system 1106 and its manager module 1144 and master map 1146. The data is then transmitted to the network attached storage 1110 where a destination data mover 1148 receives the data, and media module 1150 determines where the data will be stored in a storage media 1152.

As shown in dashed lines, the network 1112 could extend directly to the storage area network 1108. Also shown in dash lines, the network 1114 could extend directly to the network attached storage and the computing system 1106. These variations create greater flexibility in the storage management system 1100 and provide numerous variations to the system. Upon viewing the present disclosure, those skilled in the art will understand that numerous variations are desirable in certain circumstances.

Figure 12:
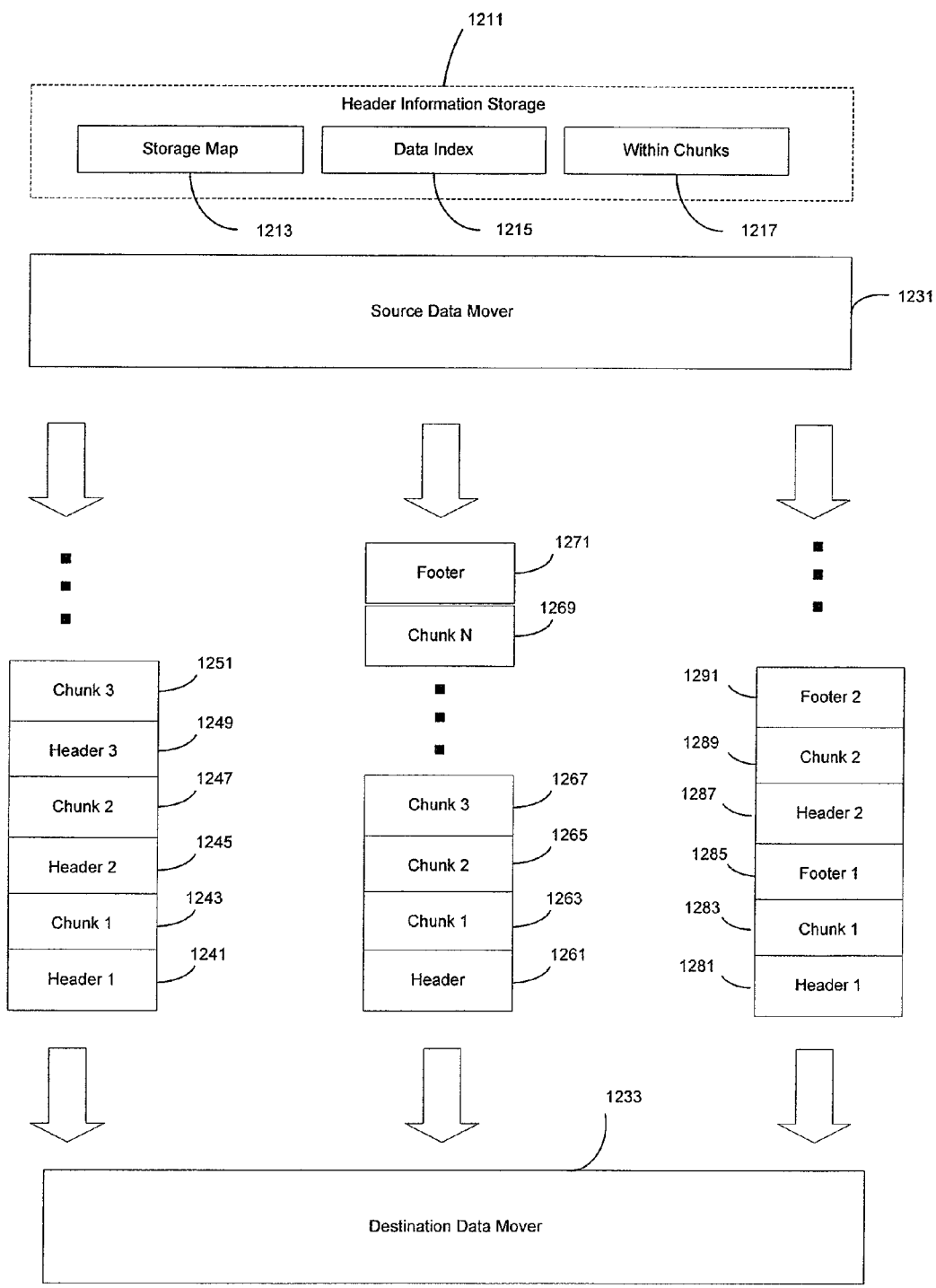
FIG. 12 is a diagram illustrating an exemplary embodiment of one operational configuration for a header information storage.

FIG. 12 is an exemplary embodiment of one operational configuration for a header information storage 1211. The header information storage 1211 includes a storage map 1213, a data index 1215, and "within chunks" 1217. Each of these portions of the header information storage 1211 may contain different or all of the instructions to move data from a storage data mover 1231 to a destination data mover 1233. Some exemplary methods for transmitting data from the source data mover 1231 to the destination data mover 1233 are illustrated. For example, a header1 1241 could begin a data transmission from the source data mover 1231 to the destination data mover 1233. The header1 1241 would be followed by a chunk1 1243. The chunk1 1243 would then be followed by a header2 1245. The header2 1245 would be followed by a chunk2 1247, which in turn is followed by a header3 1249, which is followed by a chunk3 1251, etc. In this manner, data is transferred to the destination data mover 1233 in chunks until the complete data is received at the destination data mover 1233. The configuration of the headers and chunks is controlled by the header information storage 1211. The detailed information for the data transmission may be found in the storage map 1213, the data index 1215, and the "within chunks" 1217 either separately or collectively.

Another method for transfer of data is where a single header 1261 begins the transmission of multiple chunks, i.e., chunk1 1263, chunk2 1265, chunk3 1267, . . . chunkN 1269. The chunks are followed by a footer 1271 that completes the transmission of the data in this particular embodiment.

Still another method which the header information storage 1211 may use to transmit data is shown by header1 1281, which is followed by chunk1 1283. Chunk1 1283 is then followed by a footer1 1285 to complete transmission of that particular chunk. The next chunk is sent in the same manner, i.e., a header2 1287 is followed by chunk2 1289, which is followed by a footer2 1291 to complete the transmission of a second chunk. This process continues until all chunks have been transmitted to the destination data mover 1233. Of course, the above three methods for transmission of data are exemplary only, and other alternatives could be used for transferring data between the source data mover 1231 and the destination data mover 1233.

Figure 13:
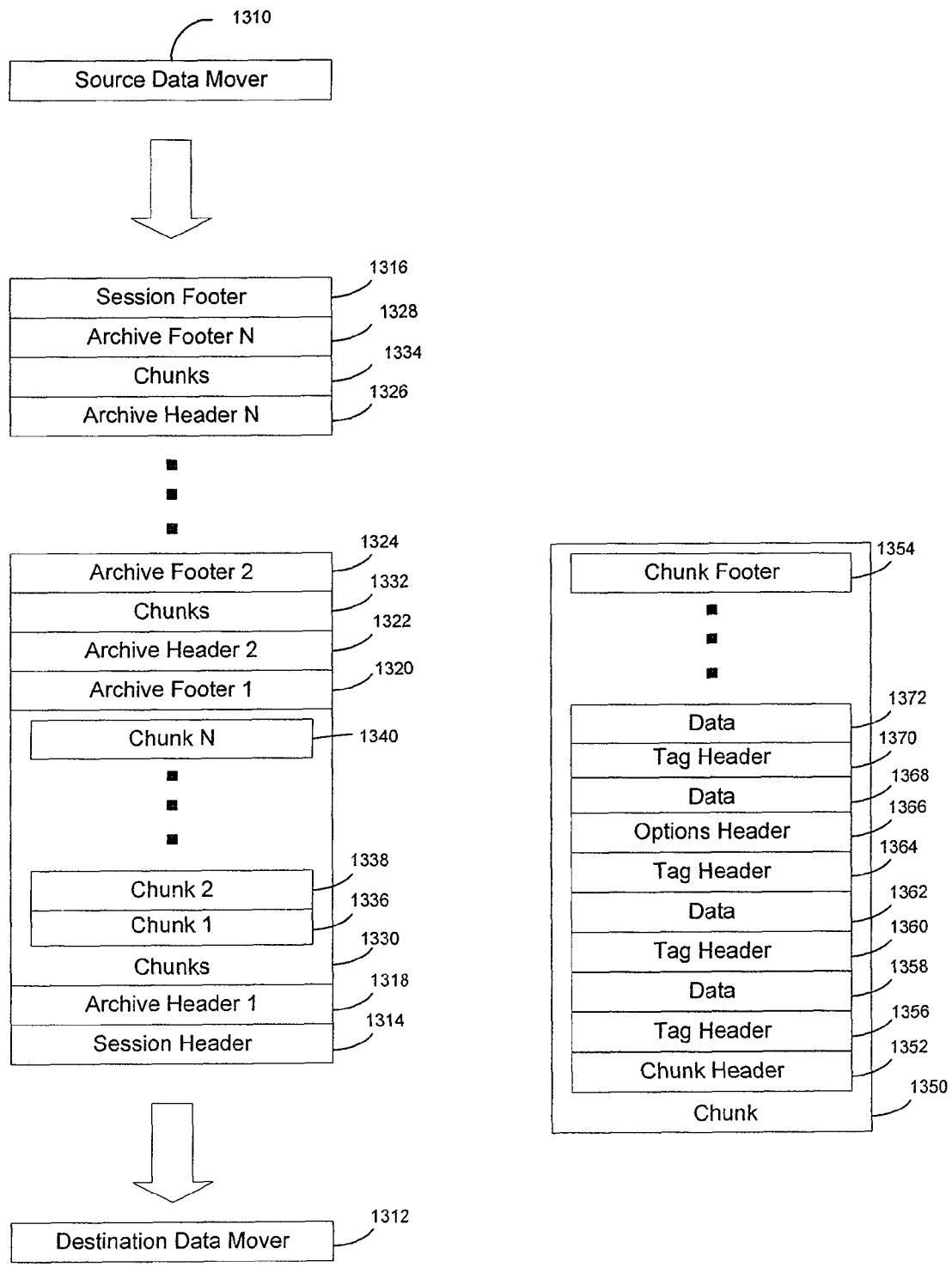
FIG. 13 is a diagram illustrating an exemplary embodiment of another operational configuration for moving data between a source data mover and a destination data mover.

FIG. 13 is an exemplary embodiment of another potential operational configuration for moving data between a source data mover 1310 and a destination data mover 1312. In this embodiment, a data pipeline is established, and a session header 1314 is sent from the source data mover 1310 to the destination data mover 1312 to indicate that a pipe should be established between the two. When the pipe is completed, a session footer 1316 is sent from the source data mover 1310 to the destination data mover 1312. In between the session header 1314 and the session footer 1316 are archives, i.e., archive header1 1318 followed by archive footer1 1320, which is followed by archive header2 1322, which is closed when archive footer2 1324 is received, which process continues until archive headerN 1326 is received and archive footerN 1328 is received to establish the completion of the particular archive. Each of the archives is comprised of chunks, as illustrated by chunks 1330, chunks 1332, and chunks 1334.

Chunk 1330 is illustrated as including chunk1 1336, chunk2 1338, . . . chunkN 1340. Each of these individual chunks of the chunk 1330 is illustrated in greater detail to the right, and is represented by chunk 1350.

The chunk 1350 includes a chunk header 1352 and a chunk footer 1354. The chunk header 1352 is followed by a tag header 1356, which is then followed by data 1358. Another tag header 1360 follows the data 1358, and is followed by data 1362 and another tag header 1364. The tag header 1364 is followed by an options header 1366, which includes processing information, such as information indicating that the data should be stored on a different type storage media. The options header 1366 may be the only information following the tag header 1364, but data 1368 is illustrated in the event that other data is to be included after the data header 1364. A tag header 1370 is then illustrated and is followed by data 1372. This process continues until the chunk footer 1354 is sent from the source data mover 1310 to the destination data mover 1312.

Block Level Transmission and Storage Operations

In one embodiment of the system of the present invention, storage operations may be performed to copy information from an information store for storage in a storage device, which may be located remotely from the information store. The storage operation is generally a two step process. First, a full copy of the information store, or a source volume contained therein, is sent across the above described pipeline to the storage device. Second, storage operations continue for incremental changes to the information store to update changed blocks, or to add blocks to the storage device when they are added to the information store. The changed and added blocks are transmitted to the storage device in chunks, which can be as little as one block at a time, or several blocks at a time.

Figure 14:
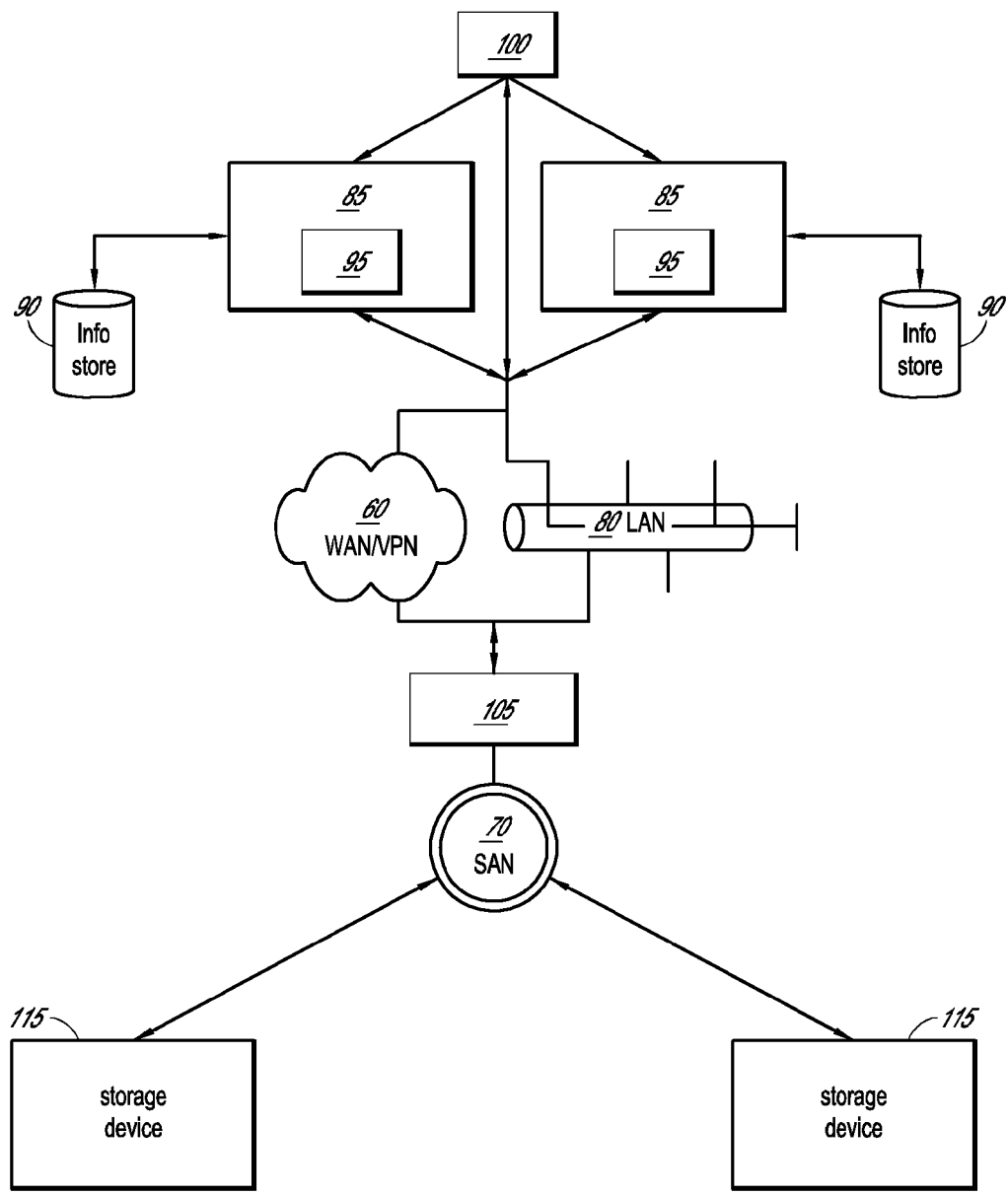
FIG. 14 is a block diagram of an exemplary embodiment of one operational configuration for performing storage operations with respect to data stored in information stores.

FIG. 14 is a block diagram of an exemplary embodiment of one operational configuration for the system of the present invention for processing storage operations for data stored in information stores 90. The storage operations generally copy data from the information stores 90 to storage devices 115. The configuration of the components of FIG. 14 may be viewed as an embodiment of the components and methods described with respect to FIGS. 1A-13. Block level data copy and transfer operations are performed from information stores 90 of one or more client computers 85 over one or more of a variety of networks and through the above described data pipeline. The data storage operations of each of one or more client computers 85 may be controlled by one or more data agents 95, which may perform many of the functions of the data mover described and illustrated above as 800 with respect to FIG. 8, as well as other processes of the data pipeline described above.

In this embodiment, at least one data agent 95 controls storage operations for each client computer 85. The data agent 95 performs at least one initial full storage operation with respect to its information store 90, or at least one volume therein. This initial storage operation may comprise a full backup, snapshot or archive of the information store or volume. However, this initial storage operation uses the method described below so that the resultant copy of the data in the storage device 115 has the same block configuration as the source information store 90.

After the initial full storage operation, each data agent 95 detects block level data changes or additions in the information store 90. Depending on configuration, each data agent 95 may either check periodically for changes or additions, or detect changes or additions as they occur in the respective information store 90.

For each information store 90, or volume therein for which storage operations are to occur, there is designated data storage space on a storage device 115 for performing storage operations from the information store 90. After each incremental update, a resulting copy of an information store or volume is stored with blocks of data that are stored in the same order as they are stored on the information store 90. In other words, the blocks are not stored out of order as they would if logical block copying was performed using only high level file copy and storage commands.

Once blocks of data are detected as being changed, added, or otherwise ready to be copied, the data agent 95 uses a read operation (which may be separate or a part of the data agent) to read the data blocks. The data agent may provide a signal to the storage manager 100 to alert the storage manager 100 a storage operation is beginning. The storage manager 100 may send a signal through the network 60 or 80 to alert the media agent 105 that the storage operation is beginning so that the media agent 105 may prepare to receive and process the data to be stored. For example, the media agent 105 may set aside resources, such as memory or multiplexed processor time, in preparation of receiving the data from the data agent 95.

In typical storage operations, such as file backup operations, the operating system of the client 85 uses file system calls to read files from the data store 90. In response to an operating system call, a controller, such as a disk controller of a hard disk, reads the data blocks containing the data of the files that are to be backed up or copied. The data of the files are read into the client computer's memory by the application perform the backup, from which the files are stored to the backup storage device in logical file format. If storage occurs across a network, the files are sent through the network interface to the storage device or computer where they are stored using the operating system controlling the storage device.

In contrast, the data agent 95 of the present invention preserves the block mapping from the information store 90 for the files. The data agent 95 packages the blocks in one or more chunks (such as those illustrated in FIGS. 12-13), and adds storage mapping to a header of each chunk to map the blocks according to the block numbers or identifiers received from the data agent 95.

The data agent 95 transmits the chunks, with the headers, to the media agent 105 for the storage device 115 that is allocated for the particular information store 90 from which the blocks of the chunks were read. Transmission may occur through the data pipe described above, which may include transmission over a network 60 or 80, which may use a virtual private network for security.

When the media agent 105 receives the chunks of blocks, it strips the header from the blocks in the chunk, reads the mapping, and stores the blocks in the designated storage area for the source information store according to the mapping. In other words, instead of storing the blocks as files using logical blocks on the storage device, the blocks which represent changed blocks from the information store replace the blocks of like number in the designated space of the information store 115. Added blocks are added to the designated space according to the block number or identifier. The storage by the media agent 105 may occur over a storage area network 70 to provide a pool of storage devices 115 that can be accessed by each of any number of media agents.

Figure 15:
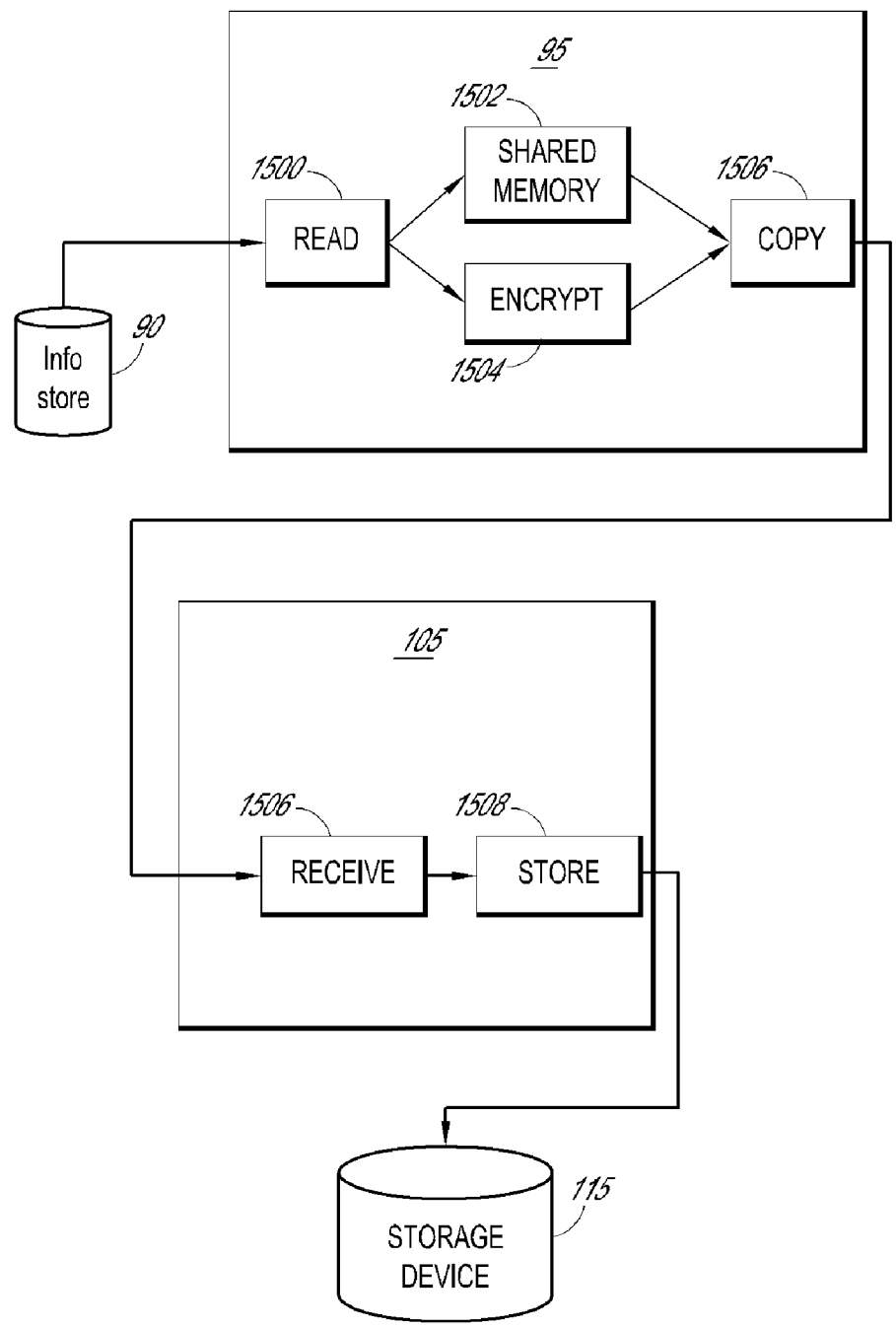
FIG. 15 illustrates a flow diagram illustrating steps to perform storage operations to copy data from an information store to a storage device.

FIG. 15 illustrates a flow diagram illustrating steps to perform storage operations from an information store 90 to a storage device 115. Changed or added blocks are detected and read, step 1500. The blocks are stored in a shared memory (e.g., such as that shown as 85A in FIG. 7), step 1502, where dedicated processes or threads are performed to prepare the blocks for transfer through a data pipeline as described above (which may be performed by the data agent 95, or by processes external to the data agent 95a). In the embodiment of FIGS. 14 and 15, the data pipeline includes network transfer operations through one or more of networks 60 and 80. As an example in FIG. 15, one of the dedicated processes may include performing encryption operations, step 1504.

After the dedicated processes are completed, a copy/data transfer process is initiated, step 1506, by the data agent 95. The copy process 1506 may include arranging the blocks into chunks, and adding the header 900 to map the blocks with each chunk, as well as preparation of the chunks for transfer though the data pipe.

The media agent 105 for the storage device receives the chunks, step 1506. As part of the receiving step 1506, the various parts of the header for each chunk that were used in transmission may be stripped. However, the block mapping is kept and stored with each of the chunks. The media agent 105 may then read the block mapping, separate each of the blocks, and store each block according to the block mapping such that each changed block replaces the block of the same number stored on the storage device 115 in the storage space designated for the information store 90, and the new blocks are added to the designated space in order according to the added block numbers or identifiers, step 1508.

Figure 16:
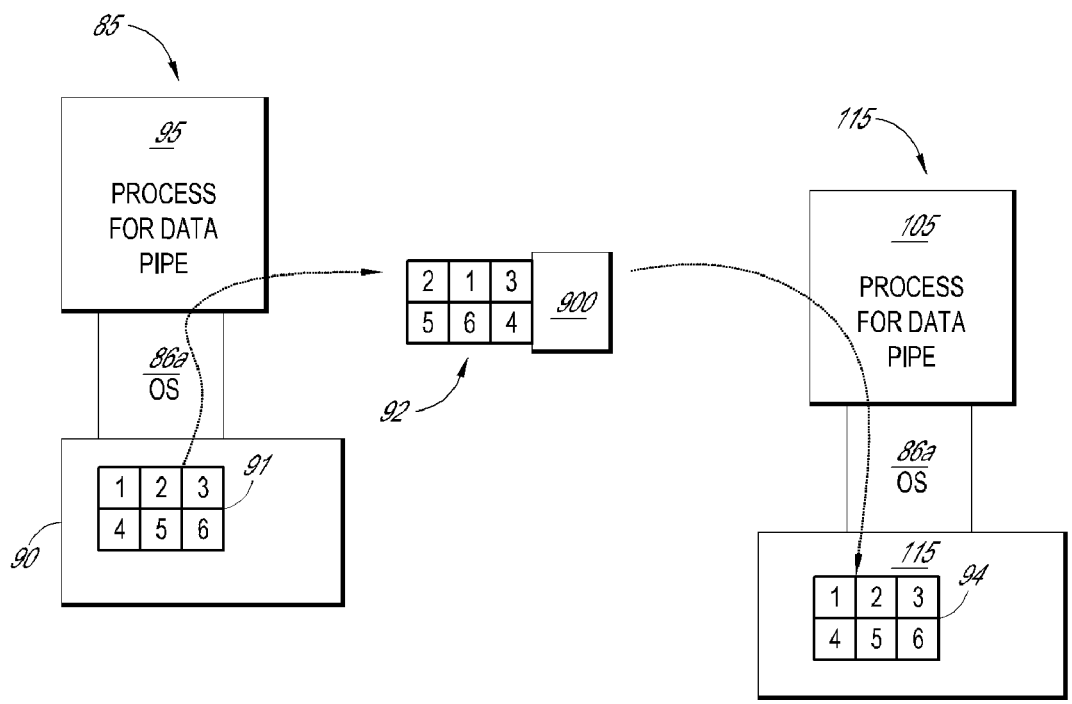
FIG. 16 is a block diagram that illustrates sample configurations that a chunk of blocks takes as it is read from the information store and copied to the storage device over the data pipeline.

Referring to FIG. 16, a block diagram illustrates sample configurations that a chunk of blocks takes as it is read from the information store 90 and copied to the storage device 115 over the data pipeline. The chunk of blocks 91 is stored, with the blocks in order, in the information store 90 of the client 85. The data agent 95 for the client 85 performs the process for the data pipe described with respect to FIG. 15 above. When storage operations for the information store are first initiated, all of the data of the information store, or volume of interest, may be copied to the storage device 115. After the initial storage operation, the data agent 95 may then run a detection process that periodically checks for block changes and additions of blocks to the source information store or source volume of the information store. If blocks are detected as being changed or added, then the storage operation described herein is performed with respect to those changed or added blocks.

Reading of the blocks from the information store 90 may be accomplished at a low level by either using resources of the operating system 86a of the client 85, or by bypassing the operating system 86a (e.g. using low-level assembly language calls to the controller of the information store 90) if the particular operating system 86a does not have facilities to perform block level reading. In FIG. 16, the blocks that are being read are shown in contiguous order for ease of illustration. However, the blocks that are read may comprise blocks that are not contiguous, depending on what blocks were changed or added.

As shown in the configuration of the chunk 92 after processing by the data agent 95, the blocks are not necessary transmitted in order (e.g., the illustrated block numbers or identifiers occur in the order 2, 1, 3, 5, 6 and 4 in the transmitted chunk 92). This may occur especially in the case where operating system calls are used to read and process the blocks 91 from the information store 90. For example, most operating system read commands perform read operations at a logical block level, leaving low level block mapping to retrieve the desired data to a disk operating system or controller. In this case, the data agent 95 may need to map the resultant read data to specific data blocks by consulting a file allocation table used by the client computer to determine the block numbers or identifiers that match the read data.

The resulting header 900 of the chunk 92 resulting from processing by the data agent 95 contains includes mapping of the blocks, which may be in the form of offset and block tagging (e.g., 912 in FIG. 9), or other types of indexing such as hash tables, binary indexes, or the like, or as known to those skilled in the art. Thus, the header 900 keeps track of each block number, or identifier, and where each block occurs in the chunk 92.

In the embodiment of FIG. 16, the media agent 105 for the storage device 115 receives the chunk for processing as described with respect to FIG. 15. Many storage devices, or the media agents, have their own operating system 85b, which may or may not provide for processing block level storage commands. Thus, the media agent 105 may either use such operating system block level commands if provided, or the media agent 105 may bypass the operating system 85b (e.g. using assembly language commands) to provide control commands to the storage device 115 to write the blocks. The media agent 105 uses the mapping from the header 900 to store the blocks 94, according to the mapping, in their proper place and order in the space on the storage device 115 designated for the information store 90.

Figure 17:
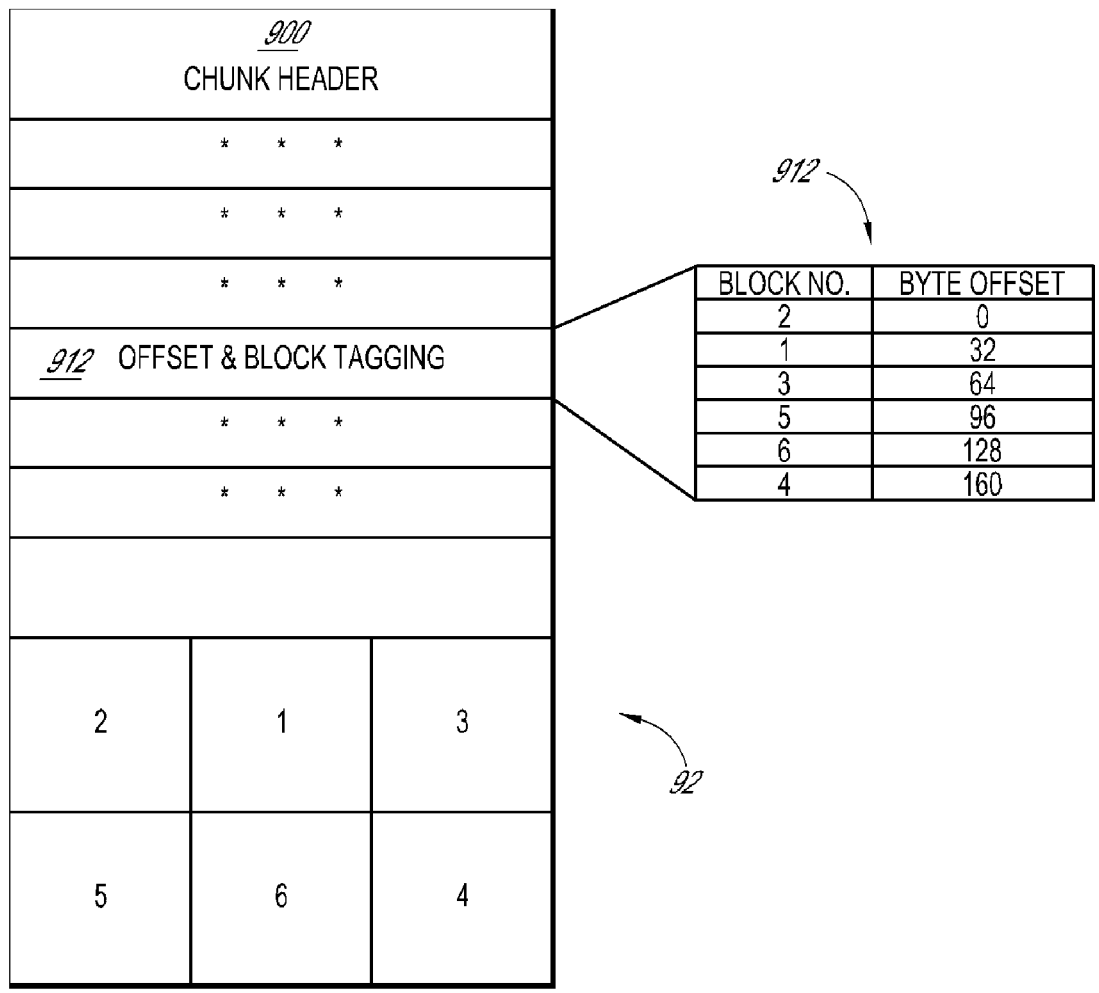
FIG. 17 illustrates a sample mapping of the blocks contained in a header for the chunk of blocks after processing by a data agent and a media agent.

FIG. 17 illustrates a sample mapping (mapping index 912) of the blocks contained in the header 900 for the chunk 92 after processing by the data agent for transmission to the media agent. The mapping for the blocks in the header is stored as an offset table 912 to keep track of the block number, or identifier, and location of the blocks in the chunk 92. Each of the records of the offset table 912 contains two fields, a block number field and a byte offset field. The example in FIG. 17 assumes that each of the blocks are 32 bytes in length. The byte offset field in each record of the offset table 912 provides where each block identified in the block number field starts relative to the beginning of the blocks in the chunk 92. The media agent for the storage device may strip the header 900 and re-order the blocks according to the block number during processing. Each of the blocks may then be written in its proper location within the designated space on the storage device.

After all of the changed and added blocks of the information store have been processed through the data pipeline, and stored on the storage device, the result on the storage devices is an exact duplicate (in terms of blocks and block order) of the source information store or volume on the information store.

If the copy of the data stored on the storage device needs to be restored, or individual blocks or groups of blocks, then the storage operations described above with respect to FIGS. 14-17 may simply be reversed. In other words, the media agent performs the read operations from the storage device, packages chunks containing blocks of data and block mapping, and sends the chunks to the client computer that requires the data to be restored. The data agent at the client computer strips the header from the blocks, and uses the block mapping to restore or write the blocks back to the information store or volume of the information store. In the case where partial or individual blocks need to be restored, the data agent may send a signal to the storage manager regarding which blocks are damaged or need to be restored, and the storage manager may then send a signal to the media agent instructing the media agent to read and transmit the stored replacement blocks accordingly.

While there has been shown preferred embodiments of the present invention, those skilled in the art will further appreciate that the present invention may be embodied in other specific forms without departing from the spirit of central attributes thereof. All such variations and modifications are intended to be within the scope of this invention as defined by the appended claims.

What is claimed is:

1. A system for copying data stored in an information store, the system comprising:
   one or more computing devices configured to generate a first mapping of a plurality of first blocks of data stored in an information store;
   one or more computing devices configured to transmit a copy of the plurality of first blocks and the first mapping to a storage device;
   one or more computing devices configured to store the copy of the plurality of first blocks in the storage device according to the first mapping;
   one or more computing devices configured to identify block level data changes in the information store; and
   one or more computing devices configured to generate a second mapping comprising a block identifier for each of a plurality of second blocks that represent changed blocks and added blocks of the block level data changes.

2. The system of claim 1 further comprising one or more computing devices configured to replace a corresponding one of the copy of the plurality of first blocks on the storage device that has the block identifier of one of the plurality of second blocks for each second block that represents one of the changed blocks.

3. The system of claim 2 further comprising one or more computing devices configured to add the second block to the storage device according to the block identifier of the second block for each second block that represents one of the added blocks.

4. The system of claim 1, wherein the copy of the plurality of first blocks is arranged into one or more chunks, each chunk associated with a header including at least a portion of the first mapping, the transmission comprising the one or more chunks and headers such that each chunk preceded by its associated header.

5. The system of claim 1, wherein the copy of the plurality of first blocks is arranged into one or more chunks, the one or more chunks associated with a header and a footer, the header including at least a portion of the first mapping and the footer indicating completion of the transmission, the transmission comprising the header, the one or more chunks, and the footer, the header followed by the one or more chunks, the one or more chunks followed by the footer.

6. The system of claim 1, wherein the copy of the plurality of first blocks is arranged into one or more chunks, each chunk of the one or more chunks associated with a header including at least a portion of the first mapping and a footer indicating completion of the associated chunk, the transmission comprising each chunk of the one or more chunks preceded by its associated header and followed by its associated footer.

7. The system of claim 1, wherein the first mapping comprises a block identifier for each of a plurality of first blocks.

8. The system of claim 1, wherein the copy of the plurality of first blocks includes at least one header, the at least one header comprising at least one of a version control, an in-line compression module, an in-line snooping module, a header transfer module, a compression algorithm selector, an offset and block tagging module, an in-line cyclic redundancy check (CRC) generator, a discard duplicate CRC module, a restart from point of failure module, and a group blocks module.

9. The system of claim 8, wherein the offset and block tagging module tags the block identifier.

10. A method for copying data stored in an information store, the method comprising:
    generating a first mapping of a plurality of first blocks of data stored in an information store;
    transmitting a copy of the plurality of first blocks and the first mapping to a storage device;
    storing the copy of the plurality of first blocks in the storage device according to the first mapping;
    identifying block level data changes in the information store; and
    generating a second mapping comprising a block identifier for each of a plurality of second blocks that represent changed blocks and added blocks of the block level data changes.

11. The method of claim 10 further comprising replacing a corresponding one of the copy of the plurality of first blocks on the storage device that has the block identifier of one of the plurality of second blocks for each second block that represents one of the changed blocks.

12. The method of claim 11 further comprising adding the second block to the storage device according to the block identifier of the second block for each second block that represents one of the added blocks.

13. The method of claim 10, further comprising arranging the copy of the plurality of first blocks into one or more chunks, each chunk associated with a header including at least a portion of the first mapping, the transmission comprising the one or more chunks and the associated headers such that each chunk is preceded by its associated header.

14. The method of claim 10, further comprising arranging the copy of the plurality of first blocks into one or more chunks, the one or more chunks associated with a header and a footer, the header including at least a portion of the first mapping and the footer indicating completion of the transmission, the transmission comprising the one or more chunks preceded by the header and followed by the footer.

15. The method of claim 10, further comprising arranging the copy of the plurality of first blocks into one or more chunks, each chunk of the one or more chunks associated with a header including at least a portion of the first mapping and a footer indicating completion of the associated chunk, the transmission comprising each chunk of the one or more chunks preceded by its associated header and followed by its associated footer.

16. The method of claim 10, wherein the copy of the plurality of first blocks includes at least one header, the at least one header comprising at least one of a version control, an in-line compression module, an in-line snooping module, a header transfer module, a compression algorithm selector, an offset and block tagging module, an in-line cyclic redundancy check (CRC) generator, a discard duplicate CRC module, a restart from point of failure module, and a group blocks module.

17. The method of claim 16, wherein the offset and block tagging module tags the block identifier.

18. A system for copying data stored in an information store, the system comprising:
    means for generating a first mapping of a plurality of first blocks of data stored in an information store;

means for transmitting a copy of the plurality of first blocks and the first mapping to a storage device;

means for storing the copy of the plurality of first blocks in the storage device according to the first mapping;

means for identifying block level data changes in the information store; and means for generating a second mapping comprising a block identifier for each of a plurality of second blocks that represent changed blocks and added blocks of the block level data changes.

19. The system of claim 18 further comprising means for replacing a corresponding one of the copy of the plurality of first blocks on the storage device that has the block identifier of one of the plurality of second blocks for each second block that represents one of the changed blocks.

20. The system of claim 19 further comprising means for adding the second block to the storage device according to the block identifier of the second block for each second block that represents one of the added blocks.

* * * * *